(12) United States Patent
Nakamura

(10) Patent No.: US 7,515,325 B2
(45) Date of Patent: Apr. 7, 2009

(54) OPTICAL DEVICE

(75) Inventor: Ryosuke Nakamura, Nagano (JP)

(73) Assignee: Seiko Epson Corporation (JP)

( * ) Notice: Subject to any disclaimer, the term of this patent is extended or adjusted under 35 U.S.C. 154(b) by 28 days.

(21) Appl. No.: 11/654,794

(22) Filed: Jan. 18, 2007

(65) Prior Publication Data

US 2007/0171530 A1    Jul. 26, 2007

(30) Foreign Application Priority Data

Jan. 19, 2006 (JP) .............................. 2006-011549
Oct. 10, 2006 (JP) .............................. 2006-277017

(51) Int. Cl.
*G02F 1/03* (2006.01)
*G02B 26/00* (2006.01)

(52) U.S. Cl. ..................... 359/260; 359/290

(58) Field of Classification Search ................ 359/260, 359/245–247, 254, 290–291, 298, 302, 317–318
See application file for complete search history.

(56) References Cited

U.S. PATENT DOCUMENTS

| | | | |
|---|---|---|---|
| 6,747,775 B2 | 6/2004 | Little | |
| 6,833,957 B2 | 12/2004 | Sato | |
| 6,930,816 B2 | 8/2005 | Mochizuki | |
| 6,954,294 B2 | 10/2005 | Sato | |
| 7,286,244 B2 | 10/2007 | Murata | |
| 2003/0123125 A1* | 7/2003 | Little | 359/290 |
| 2005/0195463 A1* | 9/2005 | Murata | 359/290 |
| 2006/0066938 A1* | 3/2006 | Chui | 359/291 |

FOREIGN PATENT DOCUMENTS

| | | |
|---|---|---|
| JP | 11-248934 | 9/1999 |
| JP | 2003-101138 | 4/2003 |
| JP | 2004-12642 | 1/2004 |
| JP | 2004-240414 | 8/2004 |
| JP | 2005-099206 | 4/2005 |
| JP | 2005-106753 | 4/2005 |

* cited by examiner

*Primary Examiner*—Scott J Sugarman
*Assistant Examiner*—Dawayne A Pinkney
(74) *Attorney, Agent, or Firm*—Harness, Dickey & Pierce, P.L.C.

(57) ABSTRACT

An optical device includes a movable portion and a fixed portion having a first light reflection portion. The movable portion has a second light reflection portion facing the first light reflection portion with a first gap. The first and second light reflection portions are configured to reflect light repeatedly between the first and second light reflection portions so as to cause interference and emit light having a wavelength corresponding to a size of the first gap. The optical device also includes a first electrode portion fixed to the fixed portion so as to face a surface of the movable portion near the first light reflection portion with a second gap between the movable portion and the first electrode portion. The optical device has a second electrode portion fixed to the fixed portion so as to face another surface of the movable portion with a third gap between the movable portion and the second electrode portion. One of the first and second electrode portions serves as a detection electrode for detecting a capacitance between the movable portion and the detection electrode. Another of the first and second electrode portions serves as a drive electrode. The optical device includes a circuit operable to generate a potential difference between the movable portion and the drive electrode so as to generate an electrostatic attraction force therebetween for changing a position and/or a posture of the movable portion.

23 Claims, 12 Drawing Sheets

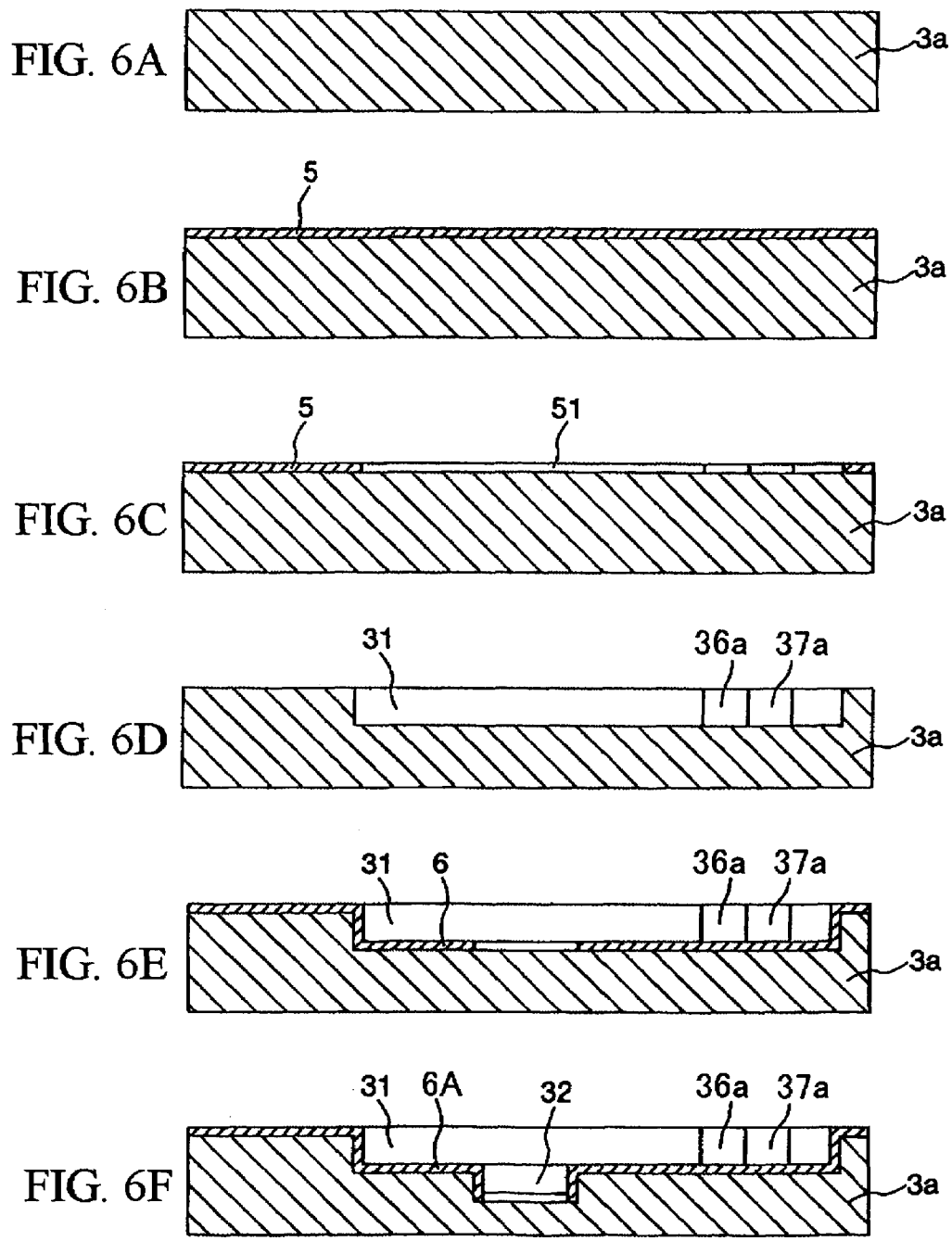

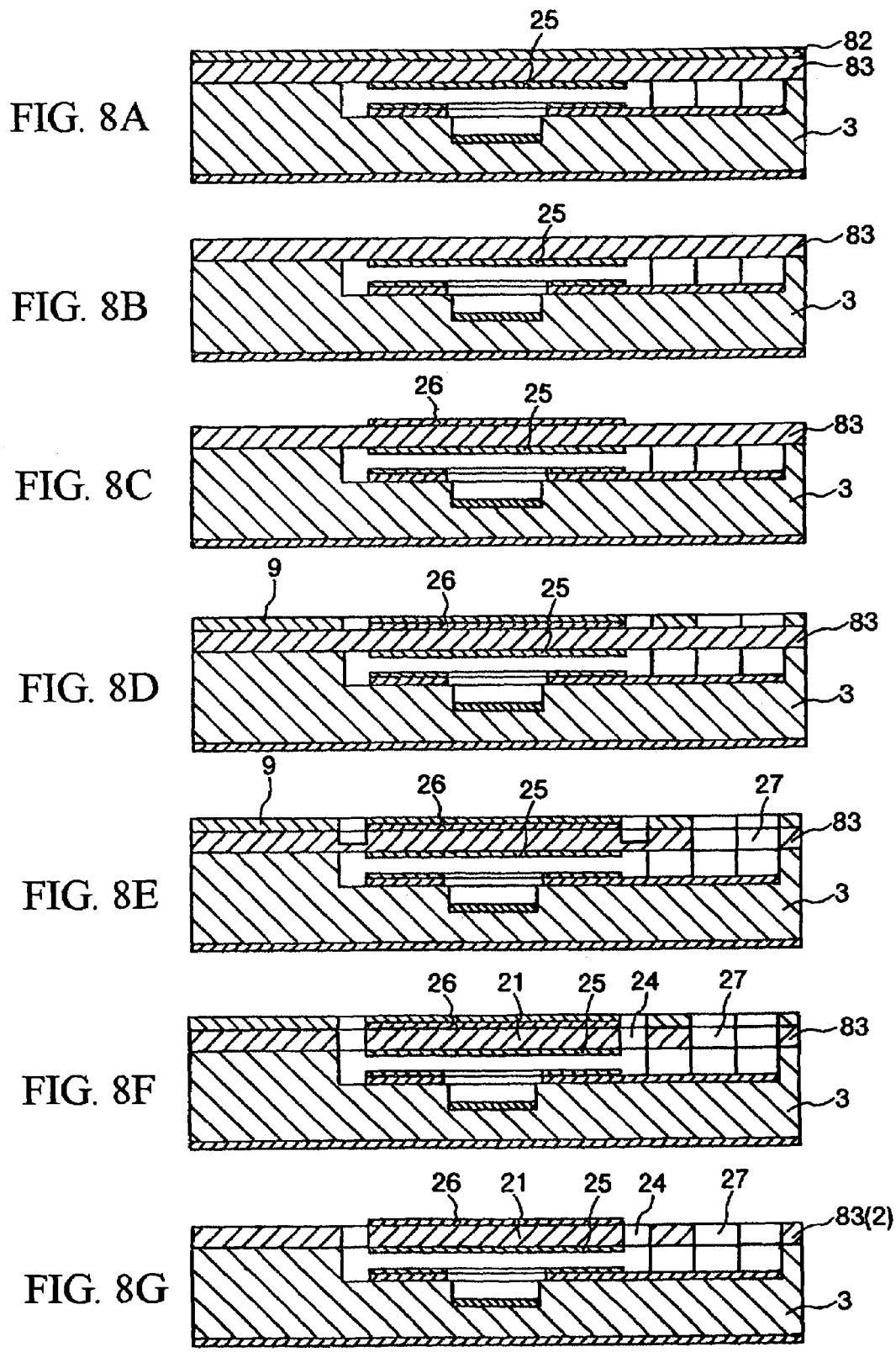

OPTICAL DEVICE

CROSS-REFERENCE TO RELATED APPLICATION

This application claims priorities to Japanese Patent Applications No. 2006-011549 filed on Jan. 19, 2006 and No. 2006-277017 filed on Oct. 10, 2006 which are hereby expressly incorporated by reference herein in their entirety.

BACKGROUND OF THE INVENTION

1. Field of the Invention

The present invention relates to an optical device, an optical tunable filter, an optical tunable filter module, and an optical spectrum analyzer.

2. Description of the Related Art

For example, an optical tunable filter for separating only light having a specific wavelength from light having a plurality of wavelengths has been known as an optical device. For instance, U.S. Pat. No. 6,747,775 (Patent Document 1) discloses such an optical tunable filter.

An optical tunable filter disclosed by Patent Document 1 has a movable portion in the form of a plate, support substrates, and reflection films formed on opposed surfaces of the movable portion and the support substrate, respectively. The movable portion is movable in a thickness direction thereof. One of the reflection films is formed on a surface of the movable portion near the support substrate, and the other of the reflection films is formed on a surface of the support substrate near the movable portion.

Further, drive electrodes are provided on the support substrate. When a potential difference is generated between the drive electrodes and the movable portion, an electrostatic attraction force is generated between the drive electrodes and the movable portion so as to move the movable portion. Thus, a clearance between two reflection films can be adjusted by moving the movable portion. When light having a plurality of wavelengths is introduced into the clearance, an interference effect is caused so as to emit only light having a wavelength corresponding to the clearance.

In order to effectively cause an interference effect, it is necessary to accurately set a distance between the movable portion and the support substrate or to enhance parallelism between the movable portion and the support substrate. Accordingly, in order to detect parallelism between the movable portion and the support substrate or a distance between the movable portion and the support substrate, it is necessary to provide a plurality of drive electrodes and a plurality of detection electrodes provided on the support substrate so as to correspond to the drive electrodes. Parallelism between the movable portion and the support substrate or a distance between the movable portion and the support substrate is detected based on a capacitance between the movable portion and the detection electrodes.

However, in the optical tunable filter of Patent Document 1, the support substrate has a flat surface near the movable portion. Accordingly, the detection electrodes are provided on the same plane as the drive electrodes. Thus, if distances between the drive electrodes and the detection electrodes are short, then a coupling capacitance between the drive electrodes and the detection electrodes becomes so large that it is difficult to perform the detection with high accuracy.

Further, if distances between the drive electrodes and the detection electrodes are set to be longer in order to reduce a coupling capacitance produced between the drive electrodes and the detection electrodes, then it is necessary to reduce an area of the drive electrodes so as to compensate the long distances between the drive electrodes and the detection electrodes. Accordingly, a driving voltage becomes high.

SUMMARY OF THE INVENTION

The present invention has been made in view of the above drawbacks. It is, therefore, an object of the present invention to provide an optical device, an optical tunable filter, an optical tunable filter module, and an optical spectrum analyzer which can have excellent optical properties with a reduced driving voltage.

The above object is attained by the following present invention.

According to a first aspect of the present invention, there is provided an optical device which can have excellent optical properties with a reduced driving voltage. The optical device includes a movable portion and a fixed portion having a first light reflection portion. The movable portion has a second light reflection portion facing the first light reflection portion with a first gap being formed between the first light reflection portion and the second light reflection portion. The movable portion is movable with respect to the fixed portion so as to change the first gap between the first light reflection portion and the second light reflection portion. The first light reflection portion and the second light reflection portion are configured to reflect light repeatedly between the first light reflection portion and the second light reflection portion so as to cause interference and emit light having a wavelength corresponding to a size of the first gap. The optical device also includes a first electrode portion fixed to the fixed portion so as to face a first surface of the movable portion near the first light reflection portion with a second gap being formed between the movable portion and the first electrode portion. Further, the optical device has a second electrode portion fixed to the fixed portion so as to face a second surface opposite to the first surface of the movable portion with a third gap being formed between the movable portion and the second electrode portion. One of the first electrode portion and the second electrode portion serves as a detection electrode for detecting a capacitance between the movable portion and the detection electrode. Another of the first electrode portion and the second electrode portion serves as a drive electrode. The optical device includes a circuit operable to generate a potential difference between the movable portion and the drive electrode so as to generate an electrostatic attraction force therebetween for changing a position and/or a posture of the movable portion.

With the above arrangement, a long distance can be maintained between the drive electrode and the detection electrode. As a result, it is possible to reduce a coupling capacitance produced between the drive electrode and the detection electrode. Accordingly, it is possible to detect a capacitance between the movable portion and the detection electrode with high accuracy and to accurately move the movable portion so as to have a desired position and posture based on the detection results. At that time, the drive electrode and the detection electrode can be located so as to overlap with each other in a plan view. Therefore, it is possible to increase an area of the drive electrode so as to reduce a driving voltage and simultaneously increase an area of the detection electrode so as to improve detection accuracy. Thus, the optical device according to the present invention can have excellent optical properties with a reduced driving voltage.

The circuit may be operable to generate the potential difference based on a detection result of the detection electrode.

In this case, it is possible to accurately move the movable portion so as to have a desired position and posture.

It is preferred that the circuit includes a switching unit operable to switch the first electrode portion and the second electrode portion between a function of the detection electrode and a function of the drive electrode. Thus, the movable portion can be moved either toward the first electrode portion or toward the second electrode portion. Accordingly, it is possible to reduce a stress produced in the movable portion and widen a movable range of the movable portion. As a result, the optical device can be used for light having a wide range of wavelengths.

Each of the first electrode portion and the second electrode portion may have a plurality of electrodes. In this case, it is possible to control a distance between the first light reflection portion and the second light reflection portion and parallelism between the first light reflection portion and the second light reflection portion with high accuracy so that the optical device has excellent optical properties.

The first electrode portion may have a plurality of first electrodes. The second electrode portion may have the same number of second electrodes as the first electrodes. The first electrodes may be paired with the second electrodes. In this case, a driving voltage can readily be set when a posture of the movable portion is changed.

It is preferred that the first electrode portion has a shape similar to a shape of the second electrode portion. In this case, a driving voltage can more readily be set when a posture of the movable portion is changed.

It is also preferred that the first electrode portion has the same size as the second electrode portion. In this case, a driving voltage can more readily be set when a posture of the movable portion is changed.

The optical device may further include a support portion for supporting the movable portion and a connection portion connecting the movable portion to the support portion so that the movable portion can be moved with respect to the support portion. The movable portion may be formed integrally with the support portion and the connection portion. In this case, it is possible to stabilize a posture of the movable portion with respect to the substrate.

The optical device may further includes a first substrate in which the movable portion, the support portion, and the connection portion are formed, a second substrate fixed to the support portion on a first surface of the first substrate, a third substrate fixed to the support portion on a second surface of the first substrate, and a hermetically sealed space formed between the first substrate, the second substrate, and the third substrate so that the movable portion can be moved within the hermetically sealed space. The first electrode portion and the first light reflection portion may be provided on the second substrate. The second electrode portion may be provided on the third substrate. In this case, with a relatively simple structure, it is possible to prevent contact between the movable portion and outside air and to stably operate movable portion.

The second substrate may have a recess formed in a surface thereof near the first substrate. The recess may have a bottom on which the first light reflection portion and the first electrode portion are provided. In this case, it is not necessary to provide any spacer member between the first substrate and the second substrate. Thus, it is possible to reduce the number of parts in the optical device and to form a hermetically sealed space between the first substrate and the second substrate.

The second substrate may have a first recess having a bottom on which the first electrode portion is provided and a second recess formed in the bottom of the first recess so as to be surrounded by the first recess. The second recess may have a bottom on which the first light reflection portion is provided. In this case, while a distance between the first light reflection portion and the second light reflection portion is set to be longer in order to increase a wavelength of interfering light, a distance between the first electrode portion and the movable portion can be made shorter to reduce a driving voltage.

It is preferred that the first electrode portion is provided so as to surround the first light reflection portion. In this case, it is possible to readily detect a posture of the movable portion with respect to the substrate with accuracy.

The first substrate may mainly be made of silicon. In this case, the optical device can have excellent optical properties and durability.

At least one of the second substrate and the third substrate may mainly be made of glass. In this case, light can be introduced from the exterior of the optical device through the second substrate and/or the third substrate into between the first light reflection portion and the second light reflection portion. Further, light can be emitted from between the first light reflection portion and the second light reflection portion through the second substrate and/or the third substrate into the exterior of the optical device. Furthermore, visibility can be improved so that defects such as foreign matter mixed into a device can readily be detected.

At least one of the second substrate and the third substrate may mainly be made of glass containing alkali metal ions. In this case, the first substrate can be bonded firmly to the second substrate and/or the third substrate with ease by anodic bonding when the first substrate is mainly made of silicon.

The first substrate may be formed by processing one of Si layers in an SOI wafer. In this case, the movable portion, the support portion, and the connection portion can be formed relatively easily with high accuracy.

At least one of the first light reflection portion and the second light reflection portion may be formed by a dielectric multilayer film. In this case, it is possible to prevent an optical loss at the time of interference of light between the first light reflection portion and the second light reflection portion. Thus, optical properties of the optical device can be improved.

It is preferred that a distance between the first electrode portion and the movable portion is substantially the same as a distance between the second electrode portion and the movable portion in a state such that the potential difference is not generated. In this case, a driving voltage can readily be set when a position and/or a posture of the movable portion is changed.

It is also preferred that the first electrode portion and the second electrode portion are provided symmetrically with respect to the movable portion in a state such that the potential difference is not generated. In this case, a driving voltage can more readily be set when a position and/or a posture of the movable portion is changed.

According to a second aspect of the present invention, there is provided an optical tunable filter which can have excellent optical properties with a reduced driving voltage. The optical tunable filter includes a movable portion and a fixed portion having a first light reflection portion. The movable portion has a second light reflection portion facing the first light reflection portion with a first gap being formed between the first light reflection portion and the second light reflection portion. The movable portion is movable with respect to the fixed portion so as to change the first gap between the first light reflection portion and the second light reflection portion. The first light reflection portion and the second light reflection portion are configured to reflect light repeatedly between the first light reflection portion and the second light reflection portion so as to cause interference and emit light having a wavelength corresponding to a size of the first gap. The optical tunable filter also includes a first electrode portion fixed to the fixed portion so as to face a first surface of the movable portion near the first light reflection portion with a second gap being formed between the movable portion and the first electrode portion. Further, the optical tunable filter has a second electrode portion fixed to the fixed portion so as to face a second surface opposite to the first surface of the movable portion with a third gap being formed between the movable portion and the second electrode portion. One of the first electrode portion and the second electrode portion serves as a detection electrode for detecting a capacitance between the movable portion and the detection electrode. Another of the first electrode portion and the second electrode portion serves as a drive electrode. The optical tunable filter includes a circuit operable to generate a potential difference between the movable portion and the drive electrode so as to generate an electrostatic attraction force therebetween for changing a position and/or a posture of the movable portion.

With the above arrangement, a long distance can be maintained between the drive electrode and the detection electrode. As a result, it is possible to reduce a coupling capacitance produced between the drive electrode and the detection electrode. Accordingly, it is possible to detect a capacitance between the movable portion and the detection electrode with high accuracy and to accurately move the movable portion so as to have a desired position and posture based on the detection results. At that time, the drive electrode and the detection electrode can be located so as to overlap with each other in a plan view. Therefore, it is possible to increase an area of the drive electrode so as to reduce a driving voltage and simultaneously increase an area of the detection electrode so as to improve detection accuracy. Thus, the optical tunable filter according to the present invention can have excellent optical properties with a reduced driving voltage.

According to a third aspect of the present invention, there is provided an optical tunable filter module which can have excellent optical properties with a reduced driving voltage. The optical tunable filter module includes a movable portion and a fixed portion having a first light reflection portion. The movable portion has a second light reflection portion facing the first light reflection portion with a first gap being formed between the first light reflection portion and the second light reflection portion. The movable portion is movable with respect to the fixed portion so as to change the first gap between the first light reflection portion and the second light reflection portion. The first light reflection portion and the second light reflection portion are configured to reflect light repeatedly between the first light reflection portion and the second light reflection portion so as to cause interference and emit light having a wavelength corresponding to a size of the first gap. The optical tunable filter module also includes a first electrode portion fixed to the fixed portion so as to face a first surface of the movable portion near the first light reflection portion with a second gap being formed between the movable portion and the first electrode portion. Further, the optical tunable filter module has a second electrode portion fixed to the fixed portion so as to face a second surface opposite to the first surface of the movable portion with a third gap being formed between the movable portion and the second electrode portion. One of the first electrode portion and the second electrode portion serves as a detection electrode for detecting a capacitance between the movable portion and the detection electrode. Another of the first electrode portion and the second electrode portion serves as a drive electrode. The optical tunable filter module includes a circuit operable to generate a potential difference between the movable portion and the drive electrode so as to generate an electrostatic attraction force therebetween for changing a position and/or a posture of the movable portion.

With the above arrangement, a long distance can be maintained between the drive electrode and the detection electrode. As a result, it is possible to reduce a coupling capacitance produced between the drive electrode and the detection electrode. Accordingly, it is possible to detect a capacitance between the movable portion and the detection electrode with high accuracy and to accurately move the movable portion so as to have a desired position and posture based on the detection results. At that time, the drive electrode and the detection electrode can be located so as to overlap with each other in a plan view. Therefore, it is possible to increase an area of the drive electrode so as to reduce a driving voltage and simultaneously increase an area of the detection electrode so as to improve detection accuracy. Thus, the optical tunable filter module according to the present invention can have excellent optical properties with a reduced driving voltage.

According to a fourth aspect of the present invention, there is provided an optical spectrum analyzer which can have excellent optical properties with a reduced driving voltage. The optical spectrum analyzer includes a movable portion and a fixed portion having a first light reflection portion. The movable portion has a second light reflection portion facing the first light reflection portion with a first gap being formed between the first light reflection portion and the second light reflection portion. The movable portion is movable with respect to the fixed portion so as to change the first gap between the first light reflection portion and the second light reflection portion. The first light reflection portion and the second light reflection portion are configured to reflect light repeatedly between the first light reflection portion and the second light reflection portion so as to cause interference and emit light having a wavelength corresponding to a size of the first gap. The optical spectrum analyzer also includes a first electrode portion fixed to the fixed portion so as to face a first surface of the movable portion near the first light reflection portion with a second gap being formed between the movable portion and the first electrode portion. Further, the optical spectrum analyzer has a second electrode portion fixed to the fixed portion so as to face a second surface opposite to the first surface of the movable portion with a third gap being formed between the movable portion and the second electrode portion. One of the first electrode portion and the second electrode portion serves as a detection electrode for detecting a capacitance between the movable portion and the detection electrode. Another of the first electrode portion and the second electrode portion serves as a drive electrode. The optical spectrum analyzer includes a circuit operable to generate a potential difference between the movable portion and the drive electrode so as to generate an electrostatic attraction force therebetween for changing a position and/or a posture of the movable portion.

With the above arrangement, a long distance can be maintained between the drive electrode and the detection electrode. As a result, it is possible to reduce a coupling capacitance produced between the drive electrode and the detection electrode. Accordingly, it is possible to detect a capacitance between the movable portion and the detection electrode with high accuracy and to accurately move the movable portion so as to have a desired position and posture based on the detection results. At that time, the drive electrode and the detection electrode can be located so as to overlap with each other in a plan view. Therefore, it is possible to increase an area of the drive electrode so as to reduce a driving voltage and simultaneously increase an area of the detection electrode so as to improve detection accuracy. Thus, the optical spectrum analyzer according to the present invention can have excellent optical properties with a reduced driving voltage.

The above and other objects, features, and advantages of the present invention will be apparent from the following description when taken in conjunction with the accompanying drawings which illustrate preferred embodiments of the present invention by way of example.

BRIEF DESCRIPTION OF THE DRAWINGS

FIGS. 6A to 6J are views explanatory of a manufacturing method of the optical device shown in FIG. 1;

FIGS. 8A to 7G are views explanatory of a manufacturing method of the optical device shown in FIG. 1;

DETAILED DESCRIPTION OF THE PREFERRED EMBODIMENTS

Figure 1:
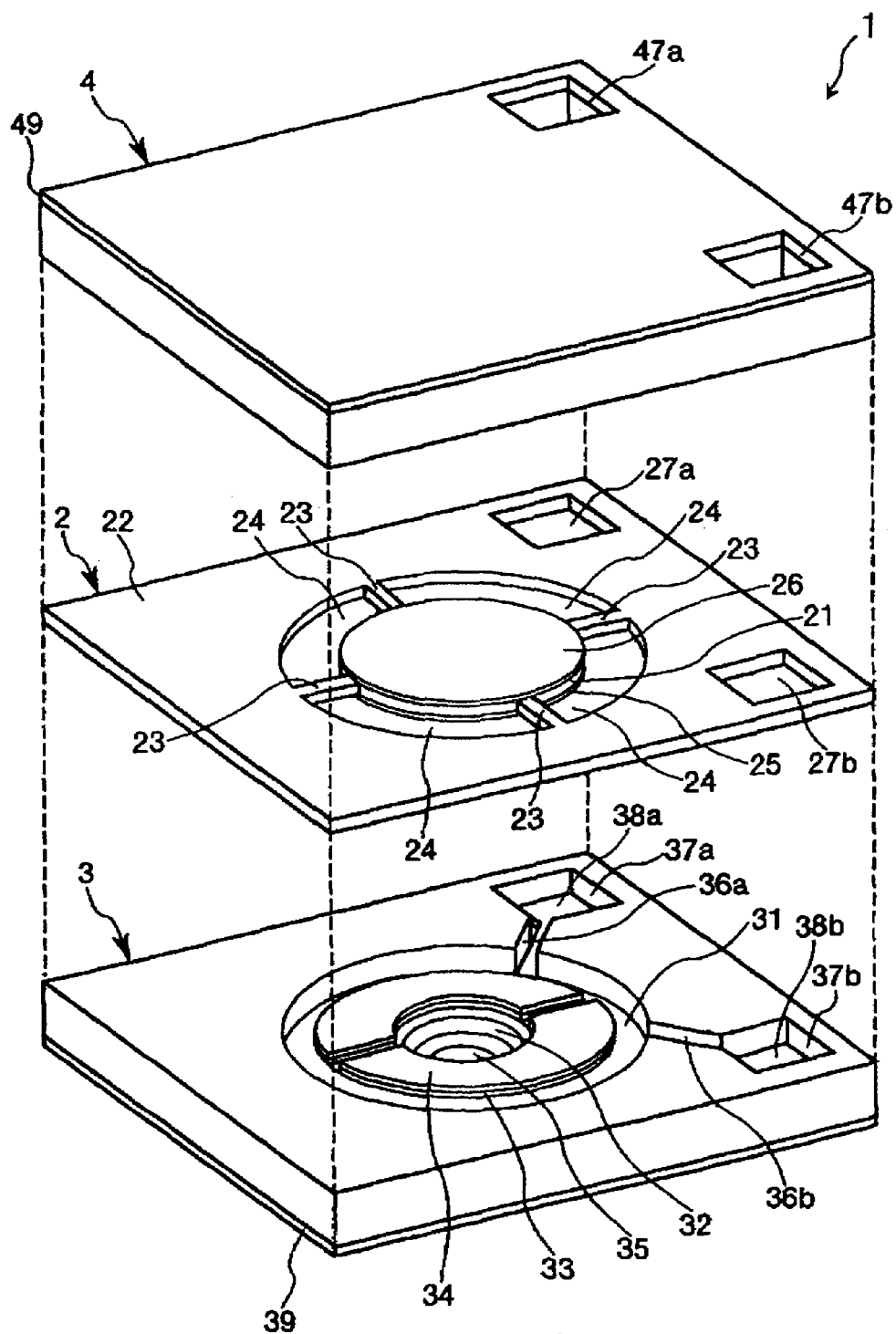
FIG. 1 is an exploded perspective view showing an optical device (optical tunable filter) according to an embodiment of the present invention.

An optical device, an optical tunable filter, an optical tunable filter module, and an optical spectrum analyzer according to embodiments of the present invention will be described below with reference to FIGS. 1 to 11. Like or corresponding parts are denoted by like or corresponding reference numerals throughout drawings, and will not be described below repetitively.

Figure 2:
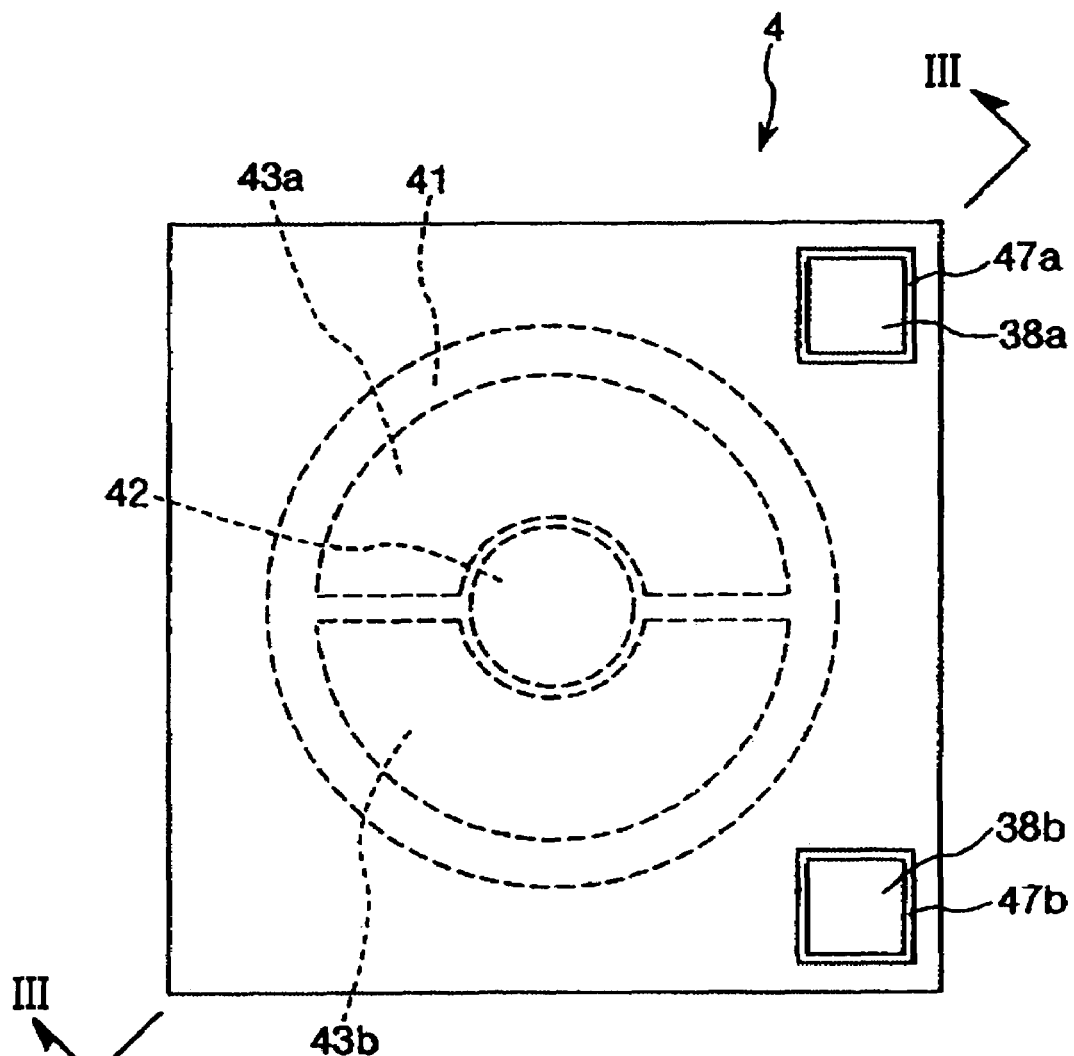
FIG. 2 is a plan view showing the optical device shown in FIG. 1.
Figure 3:
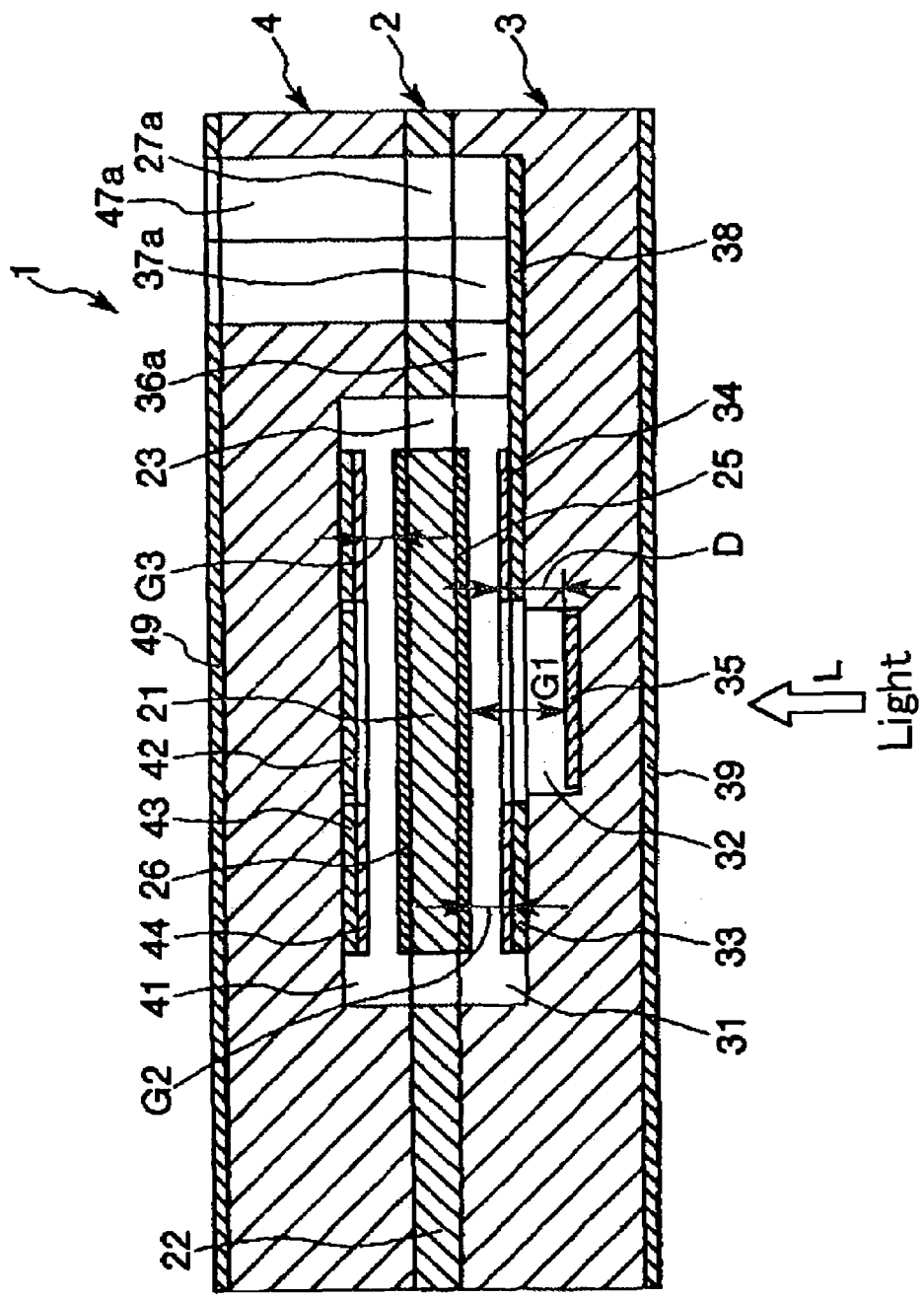
FIG. 3 is a cross-sectional view taken along line III-III of FIG. 2.
Figure 4:
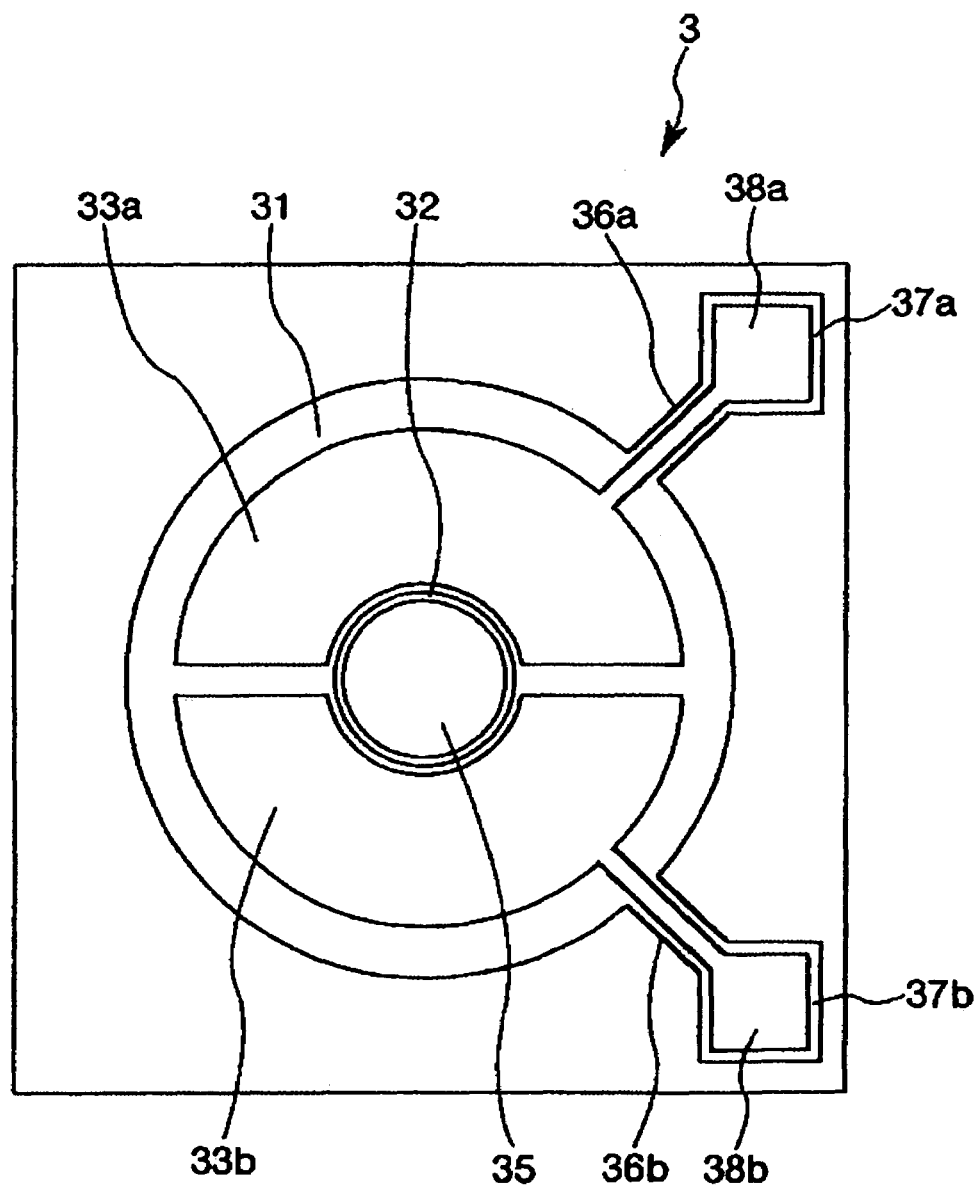
FIG. 4 is a view explanatory of electrodes in the optical device shown in FIG. 1.
Figure 5:
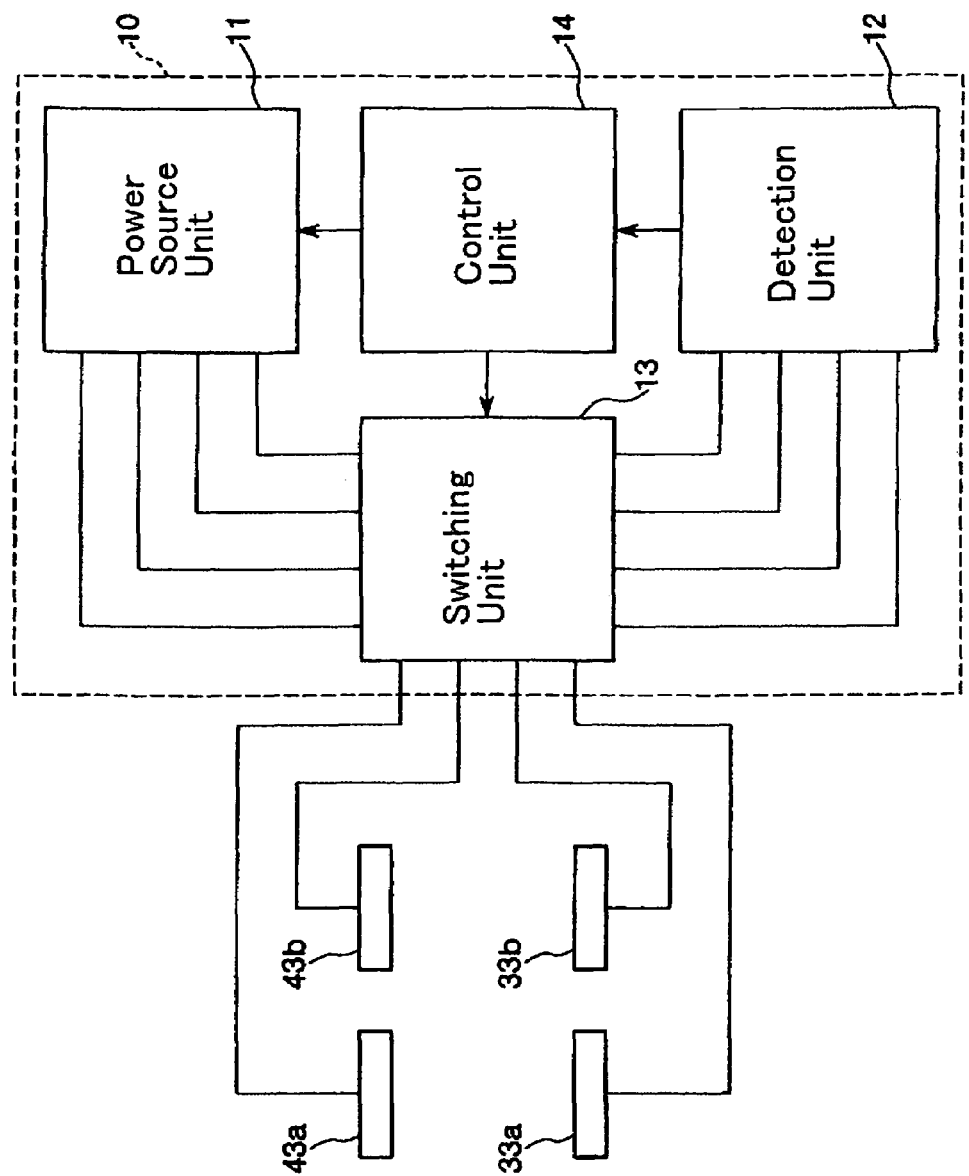
FIG. 5 is a block diagram showing a configuration of a control system in the optical device shown in FIG. 1.

FIG. 1 is an exploded perspective view showing an optical device (optical tunable filter) according to an embodiment of the present invention. FIG. 2 is a plan view showing the optical device shown in FIG. 1. FIG. 3 is a cross-sectional view taken along line III-III of FIG. 2. FIG. 4 is a view explanatory of electrodes in the optical device shown in FIG. 1. FIG. 5 is a block diagram showing a configuration of a control system in the optical device shown in FIG. 1. In the following description, the upper and lower sides in FIG. 1 will be referred to as "upper" and "lower," respectively. The near, far, right, and left sides in FIGS. 2 and 4 will be referred to as "upper," "lower," "right," and "left," respectively. The upper, lower, right, and left sides in FIG. 3 will be referred to as "upper," "lower," "right," and "left," respectively.

The optical device 1 shown in FIG. 1 is an optical tunable filter capable of receiving light and emitting only light having a specific wavelength (coherent light) by using an interference effect. The optical device 1 can also be used as other optical devices such as an optical switch and an optical attenuator.

As shown in FIGS. 1 and 3, the optical device 1 has a first substrate 2, a second substrate 3, and a third substrate 4. The second substrate 3 and the third substrate 4 are bonded to the first substrate 2, respectively. The optical device 1 has a first gap G1 and a second gap G2 formed between the first substrate 2 and the second substrate 3. The first gap G1 is provided for causing interference of light. The second gap G2 is provided as an electrostatic gap for generating an electrostatic attraction force when the first gap G1 is reduced. The optical device 1 also has a third gap G3 formed between the first substrate 2 and the third substrate 4. The third gap G3 is provided as an electrostatic gap for generating an electrostatic attraction force when the first gap G1 is widened. The second gap G2 can serve as a detection electrode for detecting a capacitance between a movable portion 21 and the second substrate 3. The third gap G3 can serve as a detection electrode for detecting a capacitance between the between the movable portion 21 and the third substrate 4.

In the optical device 1, when light L is introduced into the first gap G1, an interference effect is caused so as to emit only light having a wavelength corresponding to a size of the first gap G1. Components of the optical device 1 will be described in greater detail.

The first substrate 2 has a light transmittance and a conductivity. For example, the first substrate 2 is made of silicon. The first substrate 2 includes a movable portion 21 for varying the first gap G1 between the first substrate 2 and the second substrate 3, a support portion 22, and connection portions 23 for connecting the movable portion 21 to the support portion 22 in a state such that the movable portion 21 can be displaced (moved) in a vertical direction with respect to the support portion 22. Opening portions 24 having different shapes are formed in the first substrate 2 so as to integrally form the movable portion 21, the support portion 22, and the connection portions 23.

The movable portion 21 is in the form of a circular plate. The movable portion 21 is located approximately at a central portion of the first substrate 2 in the plan view. The movable portion 21 faces the second substrate 3 while the movable portion 21 is spaced from the second substrate 3. The movable portion 21 is movable in a thickness direction thereof. As a matter of course, the shape, size, and arrangement of the movable portion 21 are not limited to the illustrated example.

The thickness (average thickness) of the movable portion 21 is not limited to a specific value and is properly determined by a material of the movable portion 21, a use of the device, and the like. It is preferred that the thickness of the movable portion 21 is in a range of about 1 µm to about 500 µm, preferably about 10 µm to about 100 µm.

Further, the movable portion 21 has a movable reflection film (HR coat) 25 formed on a surface of the movable portion 21 facing the second substrate 3 (i.e., a lower surface of the movable portion 21). The movable reflection film 25 is used to reflect light, which has been introduced into the first gap G1 from below the optical device 1 as shown in FIG. 3, repeatedly between the movable reflection film 25 and a fixed reflection film 35 serving as a first light reflection portion, which will be described later. The movable reflection film 25 serves as a second light reflection portion for reflecting light at a relatively high reflectivity.

The movable portion 21 also has a movable antireflection film (AR coat) 26 formed on a surface of the movable portion 21 opposite to the second substrate 3 (i.e., an upper surface of the movable portion 21). The movable antireflection film 26 serves to suppress reflection of light. The movable antireflection film 26 is used to prevent the light, which has been introduced into the first gap G1 from below the optical device 1 as shown in FIG. 3, from being reflected toward a downward side in FIG. 3 at an interface between the upper surface of the first substrate 2 and outside air.

The movable reflection film 25 and the movable antireflection film 26 can be formed of any type of films as long as they have required optical properties. It is preferred that each of the movable reflection film 25 and the movable antireflection film 26 is formed of a dielectric multilayer film. Specifically, it is preferred that the movable reflection film (dielectric multilayer film) 25 and the movable antireflection film 26 has a plurality of layers in which layers having a high refractive index and layers having a low refractive index are alternately stacked. In this case, it is possible to prevent an optical loss at the time of interference of light between the movable reflection film 25 and the fixed reflection film 35. Thus, optical properties of the optical device 1 can be improved.

The layer having a high refractive index can be made of any material as long as the movable reflection film 25 or the movable antireflection film 26 has required optical properties. In a case of use in a visible light range or an infrared light range, $Ti_2O$, $Ta_2O_5$, niobium oxide, or the like may be used as a material for the layer having a high refractive index. In a case of use in an ultraviolet light range, $Al_2O_3$, $HfO_2$, $ZrO_2$, $ThO_2$, or the like may be used as a material for the layer having a high refractive index. In the present embodiment, since the first substrate 2 is made of silicon, infrared light is used for the optical device 1. Accordingly, $Ti_2O$, $Ta_2O_5$, niobium oxide, or the like can suitably be used as a material for the layer having a high refractive index.

The layer having a low refractive index can be made of any material as long as the movable reflection film 25 or the movable antireflection film 26 has required optical properties. For example, $MgF_2$, $SiO_2$, or the like may be used as a material for the layer having a low refractive index. Particularly, a material mainly including $SiO_2$ can suitably be used for the layer having a low refractive index.

The number and thickness of layers having a high refractive index and layers having a low refractive index to form the movable reflection film 25 or the movable antireflection film 26 are determined by required optical properties. Generally, at least 12 layers are required to obtain optical properties in a case where the reflection film has a plurality of layers. Further, about 4 layers are required to obtain optical properties in a case where the antireflection film has a plurality of layers.

When the movable reflection film 25 has insulating properties, it is possible to prevent short-circuit due to contact between the movable portion 21 and a first electrode portion 33, which will be described later. Specifically, when an insulator film is provided on a surface of the movable portion 21 near the second substrate 3, it is possible to prevent short-circuit due to contact between the movable portion 21 and the first electrode portion 33.

In this case, since the movable reflection film 25 also serves as an insulator film, short-circuit due to contact between the movable portion 21 and the first electrode portion 33 can be prevented with a simple arrangement. Further, when the movable antireflection film 26 also serves as an insulator film, short-circuit due to contact between the movable portion 21 and a second electrode portion 43, which will be described later, can be prevented with a simple arrangement.

The support portion 22 is formed so as to surround the movable portion 21. The movable portion 21 is supported via the connection portions 23 by the support portion 22.

A plurality of connection portions 23 (four connection portions 23 in the present embodiment) are provided around the movable portion 21 at equal intervals along a circumferential direction of the movable portion 21. The connection portions 23 have elasticity (flexibility). Thus, the movable portion 21 is configured to be movable in the thickness direction (vertical direction) in a state such that the movable portion 21 is spaced from the second substrate 3 and is approximately parallel to the second substrate 3. The number, position, and shape of the connection portions 23 should be determined such that the movable portion 21 is movable with respect to the support portion 22, but are not limited to the illustrated example.

Further, the first substrate 2 has opening portions 27a and 27b for providing access to extension electrodes 38a and 38b, which will be described later, from an outside of the device. The opening portions 27a and 27b also serve as a pressure release mechanism to prevent a pressure in a space between the first substrate 2 and the second substrate 3 from differing from a pressure in an outer space during a manufacturing process of the optical device 1.

It is preferred that the movable portion 21, the support portion 22, and the connection portions 23 are integrally formed in the first substrate 2. In this case, it is possible to stabilize a posture of the movable portion 21 with respect to the second substrate 3.

When the movable portion 21, the support portion 22, and the connection portions 23 are mainly made of silicon, the optical device 1 can have excellent optical properties and durability. Particularly, the movable portion 21, the support portion 22, and the connection portions 23 can be formed relatively easily with high accuracy by processing one of Si layers in an SOI wafer.

The second substrate 3 is bonded onto a lower surface of the support portion 22 of the first substrate 2. The second substrate 3 has a light transmittance. The second substrate 3 has a first recess 31 and a second recess 32 formed on one surface thereof. The first recess 31 defines the second gap G2 between the first substrate 2 and the second substrate 3. The second recess 32 defines the first gap G1 inside of the first recess 31 between the first substrate 2 and the second substrate 3.

The second substrate 3 should have a light transmittance with respect to wavelengths of light to be used. However, the material of the second substrate 3 is not limited to a specific one. Examples of the material of the second substrate 3 include silicon and various glasses such as soda-lime glass, crystalline glass, silica glass, lead glass, potassium glass, borosilicate glass, sodium borosilicate glass, and no-alkali glass.

Particularly, it is preferred that the second substrate 3 is made of glass containing alkali metal (movable ions) such as sodium (Na) or potassium (K). In this case, the second substrate 3 can be bonded firmly to the first substrate 2 with ease by anodic bonding, for example, when the first substrate 2 is made of silicon.

When the first substrate 2 and the second substrate 3 are bonded to each other by anodic bonding, it is desirable to reduce a difference between a thermal expansion coefficient of the first substrate 2 and a thermal expansion coefficient of the second substrate 3. More specifically, it is preferred that the difference is not more than $50 \times 10^{-7}$ °$C.^{-1}$.

In this case, a stress produced between the first substrate 2 and the second substrate 3 can be reduced even if the first substrate 2 and the second substrate 3 are exposed to a high-temperature atmosphere at the time of anodic bonding. Thus, it is possible to prevent damage to the first substrate 2 and the second substrate 3.

Accordingly, it is preferred that the second substrate 3 is made of soda-lime glass, potassium glass, sodium borosilicate glass, or the like. For example, Pyrex™ glass manufactured by Corning Inc. and the like can suitably be used for the second substrate 3.

The thickness (average thickness) of the second substrate 3 is not limited to a specific value and is properly determined by a material of the second substrate 3, a use of the device, and the like. It is preferred that the thickness of the second substrate 3 is in a range of about 10 μm to about 2,000 μm, preferably about 100 μm to about 1,000 μm.

The first recess 31 has a circular outline. The first recess 31 is formed at a position corresponding to the movable portion 21, the connection portions 23, and the opening portions 24. An annular electrode portion (first electrode portion) 33 is formed on a bottom of the first recess 31 at a position corresponding to a peripheral portion of the movable portion 21. An insulator film 34 is formed on the first electrode portion 33. Thus, the first electrode portion 33 is provided on an installation surface of the second substrate 3 near the movable portion 21.

The first electrode portion 33 is approximately in the form of a ring as a whole and includes two first electrodes 33a and 33b into which the annular first electrode portion 33 is divided. As shown in FIG. 5, each of the first electrodes 33a and 33b is connected to a current-carrying circuit 10. Thus, a potential difference can be produced between the first electrode portion 33 and the movable portion 21. Further, a capacitance can be detected between the first electrode portion 33 and the movable portion 21. Details of the current-carrying circuit 10 will be described later.

The first electrodes 33a and 33b are provided so as to surround the second recess 32. With this configuration, an electrostatic attraction force can readily be balanced between the movable portion 21 and the first electrodes 33a and 33b. As a result, it is possible to stabilize a posture of the movable portion 21 with respect to the second substrate 3.

The first electrode portion 33 (first electrodes 33a and 33b) may be made of any conductive material. Examples of the material of the first electrode portion 33 include metal such as Cr, Al, Al alloy, Ni, Zn, and Ti, resin in which carbon or titanium is dispersed, polycrystalline silicon (polysilicon), silicon such as amorphous silicon, silicon nitride, transparent conductive material such as ITO, and Au.

The thickness (average thickness) of the first electrode portion 33 is not limited to a specific value and is properly determined by a material of the first electrode portion 33, a use of the device, and the like. It is preferred that the thickness of the first electrode portion 33 is in a range of about 0.1 μm to about 5 μm.

The insulator film 34 has the same shape as the first electrode portion 33 and serves to prevent short-circuit due to contact between the movable portion 21 and the first electrode portion 33.

Within a space inside of the first recess 31, the second gap G2 is formed as an electrostatic gap (drive gap) for driving the movable portion 21. Specifically, the second gap G2 is formed between the movable portion 21 and the first electrode portion 33.

The size of the second gap G2 (i.e., a distance between the movable portion 21 and the first electrode portion 33) is not limited to a specific value and is properly determined by a use of the device and the like. It is preferred that the size of the second gap G2 is in a range of about 0.5 μm to about 20 μm.

The second recess 32 has a circular outline and is approximately concentric with the first recess 31. The second recess 32 has an outside diameter smaller than outside diameters of the first recess 31 and the movable portion 21. A fixed reflection film 35 is formed on a bottom of the second recess 32 (i.e., a central portion of the surface of the second substrate 3 near the movable portion 21). The fixed reflection film 35 approximately has a circular shape.

As described above, the fixed reflection film 35 is used to reflect light, which has been introduced into the first gap G1 from below the optical device 1 as shown in FIG. 3, repeatedly between the movable reflection film 25 and the fixed reflection film 35. Specifically, the fixed reflection film 35 can cause interference of light having a wavelength corresponding to the size of the first gap G1 (i.e., the distance between the fixed reflection film 35 and the movable reflection film 25) in cooperation with the movable reflection film 25. The size of the first gap G1 is larger than the size of the second gap G2.

The size of the first gap G1 is not limited to a specific value and is properly determined by a use of the device and the like. It is preferred that the size of the first gap G1 is in a range of about 1 μm to about 100 μm.

As described above, when the fixed reflection film 35 is provided on the bottom of the second recess 32, it is possible to set an available wavelength band corresponding to a depth of the second recess 32 irrespective of the distance between the first electrode portion 33 and the movable portion 21. Accordingly, a driving voltage can be reduced even with various available wavelength bands.

The second recess 32 may be eliminated. In this case, the first electrode portion may be provided approximately on the entire area of the bottom of the first recess 31 with the fixed reflection film 35 formed on the first electrode portion unless optical properties of the optical device 1 are deteriorated. Thus, an area of a detection electrode portion and a drive electrode portion can be increased so as to improve an accuracy of detecting a capacitance between the movable portion 21 and the detection electrode portion and reduce a driving voltage. Further, when the fixed reflection film is made of a conductive material, the fixed reflection film can be provided approximately on the entire area of the bottom of the first recess 31 while the movable reflection film serves as a first electrode portion including a detection electrode portion and a drive electrode portion. In this case, an area of the detection electrode portion and the drive electrode portion can also be increased so as to improve an accuracy of detecting a capacitance between the movable portion 21 and the detection electrode portion and reduce a driving voltage.

The second substrate 3 has third recesses 37a and 37b for extending the first electrodes 33a and 33b to the exterior of the second substrate 3 and groove portions 36a and 36b for communicating the third recesses 37a and 37b with the first recess 31, respectively.

The groove portion 36a and the third recess 37a have substantially the same depth as a depth of the first recess 31. An extension electrode 38a is provided on bottoms of the groove portion 36a and the third recess 37a and connected to the first electrode 33a. Similarly, the groove portion 36b and the third recess 37b have substantially the same depth as a depth of the first recess 31. An extension electrode 38b is provided on bottoms of the groove portion 36b and the third recess 37b and connected to the first electrode 33b. The extension electrodes 38a and 38b form an extension electrode portion 38.

The aforementioned materials for the first electrode portion 33 may also be used for the extension electrode portion 38. The extension electrode portion 38 may be made of any conductive material. Examples of the material of the extension electrode portion 38 include metal such as Cr, Al, Al alloy, Ni, Zn, and Ti, resin in which carbon or titanium is dispersed, polycrystalline silicon (polysilicon), silicon such as amorphous silicon, silicon nitride, transparent conductive material such as ITO, and Au.

The thickness (average thickness) of the extension electrode portion 38 is not limited to a specific value and is properly determined by a material of the extension electrode portion 38, a use of the device, and the like. It is preferred that the thickness of the extension electrode portion 38 is in a range of about 0.1 μm to about 5 μm. Further, it is preferred that the extension electrode 38a is formed integrally with the first electrode 33a and that the extension electrode 38b is formed integrally with the first electrode 33b.

Further, a fixed antireflection film 39 is formed on another surface of the second substrate 3, which is opposite to the surface in which the first recess 31 is formed. The fixed antireflection film 39 is used to prevent light, which is to be introduced into the first gap G1 from below the optical device 1 as shown in FIG. 3, from being reflected toward a downward side in FIG. 3 at an interface between a lower surface of the second substrate 3 and outside air. The configuration of the fixed reflection film 35 and the fixed antireflection film 39 is the same as the aforementioned configuration of the movable reflection film 25 and the movable antireflection film 26.

The third substrate 4, which is bonded to an opposite side of the first substrate 2 to the second substrate 3, has a light transmittance. The third substrate 4 has a recess 41 formed on one surface thereof. The recess 41 defines a third gap G3 between the first substrate 2 and the third substrate 4.

Thus, spaces for allowing movement of the movable portion 21 are formed between the first substrate 2 and the second substrate 3 and between the first substrate 2 and the third substrate 4, respectively. These spaces can hermetically be sealed. In this case, with a relatively simple structure, it is possible to prevent contact between the movable portion 21 and outside air and to stably operate movable portion 21. In the present embodiment, a portion of the first substrate 2 other than the movable portion 21, the second substrate 3, and the third substrate 4 form a fixed portion. The movable portion 21 can be moved with respect to the fixed portion.

Further, in the present embodiment, since the fixed reflection film 35 and the first electrode portion 33 are provided on the bottoms of the recesses defined in the second substrate 3, it is not necessary to provide any spacer member between the first substrate 2 and the second substrate 3. Thus, it is possible to reduce the number of parts in the optical device 1 and to form the aforementioned hermetically sealed space between the first substrate 2 and the second substrate 3.

The third substrate 4 may be made of any material as long as it has a light transmittance with respect to wavelengths of used light. The aforementioned materials for the second substrate 3 may also be used for the third substrate 4. Accordingly, when the third substrate 4 is made of glass containing alkali metal, the third substrate 4 can be bonded to the first substrate 2 by anodic bonding, as with the second substrate 3.

When at least one of the second substrate 3 and the third substrate 4 is mainly made of glass, light can be introduced from the exterior of the optical device 1 through the second substrate 3 and/or the third substrate 4 into between the fixed reflection film 35 and the movable reflection film 25. Further, light can be emitted from between the fixed reflection film 35 and the movable reflection film 25 through the second substrate 3 and/or the third substrate 4 into the exterior of the optical device 1.

The thickness (average thickness) of the third substrate 4 is not limited to a specific value and is properly determined by a material of the third substrate 4, a use of the device, and the like. It is preferred that the thickness of the third substrate 4 is in a range of about 10 μm to about 2,000 μm, preferably about 100 μm to about 1,000 μm.

The recess 41 has a circular outline. The recess 41 is formed at a position corresponding to the movable portion 21, the connection portions 23, and the opening portions 24, as with the first recess 31. The recess 41 has substantially the same depth and outside diameter as the first recess 31. Further, an annular electrode portion (second electrode portion) 43 is formed on a bottom of the recess 41 at a position corresponding to a peripheral portion of the movable portion 21. An insulator film 44 is formed on the second electrode portion 43. Thus, the second electrode portion 43 is provided on an installation surface of the third substrate 4 near the movable portion 21.

As with the first electrode portion 33, the second electrode portion 43 is approximately in the form of a ring as a whole and includes two second electrodes 43a and 43b into which the annular second electrode portion 43 is divided. The second electrodes 43a and 43b are connected to the current-carrying circuit 10 as with the first electrodes 33a and 33b. Thus, a potential difference can be produced between the second electrode portion 43 and the movable portion 21. Further, a capacitance can be detected between the second electrode portion 43 and the movable portion 21.

As described above, when at least one of the first electrode portion and the second electrode portion has a plurality of electrodes, it is possible to change a posture of the movable portion 21 or detect a posture of the movable portion 21. In a case of changing a posture of the movable portion 21, for example, by applying substantially the same voltage to the respective first electrodes 33a and 33b or the respective second electrodes 43a and 43b, the movable portion 21 can be moved so as to maintain parallelism between the fixed reflection film 35 and the movable reflection film 25. Alternatively, by applying different voltages to the respective first electrodes 33a and 33b or the respective second electrodes 43a and 43b, the movable portion 21 can be moved so that the movable reflection film 25 is inclined with respect to the fixed reflection film 35. Further, it is possible to detect not only a position of the movable portion 21 but also a posture of the movable portion 21.

Particularly, in the present embodiment, since each of the first electrode portion and the second electrode portion has a plurality of electrodes, it is possible to detect a posture of the movable portion 21 with high accuracy. Further, for example, a potential difference can be produced on only the first electrode 33a and the second electrode 43b so as to move a portion of the movable portion 21 toward the first electrode portion 33 and move another portion of the movable portion 21 toward the second electrode portion 43. As a result, it is possible to change a posture of the movable portion 21 with a wider range.

Further, the number of the first electrodes is the same as the number of the second electrodes. The first electrodes are paired with the second electrodes. Accordingly, a driving voltage can readily be set when a posture of the movable portion 21 is changed. Further, an arrangement and a process of a detection unit 12, which will be described later, are facilitated when a posture or a position of the movable portion 21 is detected.

Furthermore, since the first electrode portion 33 has a shape similar to the shape of the second electrode portion 43, a driving voltage can more readily be set when a posture of the movable portion 21 is changed. Further, an arrangement and a process of the detection unit 12 are facilitated when a posture or a position of the movable portion 21 is detected.

Further, since the size (area) of the first electrode portion 33 is the same as the size (area) of the second electrode portion 43, a driving voltage can more readily be set when a posture of the movable portion 21 is changed. Further, an arrangement and a process of the detection unit 12 are facilitated when a posture or a position of the movable portion 21 is detected.

The second electrode portion 43 (second electrodes 43a and 43b) may be made of any conductive material. The aforementioned materials for the first electrode portion 33 may also be used for the second electrode portion 43.

The thickness (average thickness) of the second electrode portion 43 is not limited to a specific value and is properly determined by a material of the second electrode portion 43, a use of the device, and the like. It is preferred that the thickness of the second electrode portion 43 is in a range of about 0.1 μm to about 5 μm.

The insulator film 44 has the same shape as the second electrode portion 43 and serves to prevent short-circuit due to contact between the movable portion 21 and the second electrode portion 43.

Within a space inside of the recess 41, the third gap G3 is formed as an electrostatic gap (drive gap) for driving the movable portion 21. Specifically, the third gap G3 is formed between the movable portion 21 and the second electrode portion 43.

It is preferred that a distance between the first electrode portion 33 and the movable portion 21 (the second gap G2) is substantially the same as a distance between the second electrode portion 43 and the movable portion 21 (the third gap G3) when no potential difference is generated between the movable portion 21 and the electrode portions 33 and 43. In this case, a driving voltage can readily be set when a position and/or a posture of the movable portion 21 is changed. Further, an arrangement and a process of the detection unit 12 are facilitated when a posture and/or a position of the movable portion 21 is detected.

Further, it is preferred that the first electrode portion 33 and the second electrode portion 43 are provided symmetrically with respect to the movable portion 21 when no potential difference is generated between the movable portion 21 and the electrode portions 33 and 43. In this case, a driving voltage can more readily be set when a position and/or a posture of the movable portion 21 is changed. Further, an arrangement and a process of the detection unit 12 are facilitated when a posture and/or a position of the movable portion 21 is detected.

The size of the third gap G3 (i.e., a distance between the movable portion 21 and the second electrode portion 43) is not limited to a specific value and is properly determined by a use of the device and the like. It is preferred that the size of the third gap G3 is in a range of about 0.5 μm to about 20 μm.

A fixed antireflection film 42 is formed at a central portion of a bottom of the recess 41. The fixed antireflection film 42 approximately has a circular shape. Specifically, the second electrode portion 43 is disposed on the bottom (installation surface) of the recess 41 so as to surround the fixed antireflection film 42.

The fixed antireflection film 42 is used to light, which has been introduced into the first gap G1 from below the optical device 1 as shown in FIG. 3, from being reflected toward a downward side in FIG. 3 at an interface between a lower surface of the third substrate 4 and outside air. The configuration of the fixed antireflection film 42 is the same as the aforementioned configuration of the movable antireflection film 26.

The third substrate 4 has opening portion 47a and 47b for allowing access to the extension electrodes 38a and 38b from the exterior of the optical device 1. The second electrode portion 43 is extended from an extension portion (not shown).

A fixed antireflection film 49 is formed on another surface of the third substrate 4, which is opposite to the surface in which the recess 41 is formed. The fixed antireflection film 49 is used to prevent light, which has been introduced into the third gap G3 from below the optical device 1 as shown in FIG. 3, from being reflected toward a downward side in FIG. 3 at an interface between an upper surface of the third substrate 4 and outside air. The configuration of the fixed antireflection film 49 is the same as the aforementioned configuration of the movable antireflection film 26.

The current-carrying circuit 10 will be described in greater detail with reference to FIG. 5.

As shown in FIG. 5, the current-carrying circuit 10 has a power source unit 11 operable to apply a voltage to the electrodes 33a, 33b, 43a, and 43b, a detection unit 12 operable to detect a capacitance between the movable portion 21 and the electrodes 33a, 33b, 43a, and 43b, a switching unit 13 operable to switch connections of the electrodes 33a, 33b, 43a, and 43b to the power source unit 11 and the detection unit 12, and a control unit 14 operable to control the power source unit 11 and the switching unit 13 based on detection results of the detection unit 12.

The power source unit 11 is configured to generate a desired potential difference between the movable portion 21 and the electrodes 33a, 33b, 43a, and 43b. Specifically, in the optical device 1, a voltage is applied selectively to the first electrode portion 33 and the second electrode portion 43 so as to generate a potential difference between the movable portion 21 and the first electrode portion 33 and/or the second electrode portion 43. Thus, it is possible to more reliably maintain a desired position and posture of the movable portion 21.

The detection unit 12 is configured to detect capacitances between the movable portion 21 and the electrodes 33a, 33b, 43a, and 43b independently of each other. Thus, a desired potential difference can be generated between the movable portion 21 and the electrodes 33a, 33b, 43a, and 43b so that the movable portion 21 has a desired position and posture.

The switching unit 13 is configured to switch connections of the electrodes 33a, 33b, 43a, and 43b to the power source unit 11 and the detection unit 12.

The control unit 14 is configured to control the power source unit 11 based on the detection results of the detection unit 12. Thus, a desired potential difference can be generated selectively between the movable portion 21 and the electrodes 33a, 33b, 43a, and 43b based on the capacitances between the movable portion 21 and the electrodes 33a, 33b, 43a, and 43b such that the movable portion 21 has a desired position and posture.

Further, the control unit 14 is operable to switch the connections of the switching unit 13, for example, depending upon a predetermined wavelength (the first gap G1).

Operation of the optical device 1 having the above arrangement will be described below.

The current-carrying circuit 10 detects a capacitance between the movable portion 21 and one of the first electrode portion 33 and the second electrode portion 43 and generates a potential difference between the movable portion 21 and the other of the first electrode portion 33 and the second electrode portion 43 based on detection signals (detection results).

More specifically, when a predetermined wavelength is smaller than the first gap G1 in a case where no voltage is applied, the first electrode portion 33 serves as a drive electrode while the second electrode portion 43 serves as a detection electrode. In this case, when the current-carrying circuit 10 applies a voltage between the movable portion 21 and the first electrode portion 33, the movable portion 21 and the first electrode portion 33 are charged into opposite polarities so as to generate a Coulomb force (electrostatic attraction force) between the movable portion 21 and the first electrode portion 33.

The movable portion 21 moves toward the first electrode portion 33 in a downward direction due to the Coulomb force and rests at a position at which the Coulomb force balances with an elastic force of the connection portions 23. Thus, the sizes of the first gap G1 and the second gap G2 are changed. At that time, a posture (inclination) of the movable portion 21 is determined by a balance between a voltage applied to the first electrode 33$a$ and a voltage applied to the first electrode 33$b$.

When the predetermined wavelength is larger than the first gap G1 in a case where no voltage is applied, the first electrode portion 33 serves as a detection electrode while the second electrode portion 43 serves as a drive electrode. In this case, when the current-carrying circuit 10 applies a voltage between the movable portion 21 and the second electrode portion 43, the movable portion 21 and the second electrode portion 43 are charged into opposite polarities so as to generate a Coulomb force (electrostatic attraction force) between the movable portion 21 and the second electrode portion 43.

The movable portion 21 moves toward the second electrode portion 43 in an upward direction due to the Coulomb force and rests at a position at which the Coulomb force balances with an elastic force of the connection portions 23. Thus, the sizes of the first gap G1 and the second gap G2 are changed. At that time, a posture (inclination) of the movable portion 21 is determined by a balance between a voltage applied to the second electrode 43$a$ and a voltage applied to the second electrode 43$b$.

When light L is applied into the first gap G1 from below the optical device 1 as shown in FIG. 3, the light L penetrates through the fixed antireflection film 39, the second substrate 3, and the fixed reflection film 35 and enters the first gap G1. At that time, the light L is hardly lost because of the fixed antireflection film 39 while entering the first gap G1.

The light is reflected repeatedly between the movable reflection film 25 and the fixed reflection film 35 (interference). At that time, the movable reflection film 25 and the fixed reflection film 35 can prevent a loss of the light L.

While the light is reflected repeatedly between the movable reflection film 25 and the fixed reflection film 35 as described above, light having wavelengths that do not meet an interference condition corresponding to the size of the first gap G1 between the movable reflection film 25 and the fixed reflection film 35 is rapidly attenuated. Only light having a wavelength that meets the interference condition remains so that it is finally emitted from the optical device 1. Accordingly, a wavelength of light penetrating through the optical device 1 can be controlled by changing a voltage applied between the movable portion 21 and the electrode portions 33 and 43 so as to change the first gap G1 (i.e., change an interference condition).

As a result of the interference of the light L, light having a wavelength corresponding to the size of the first gap G1 (coherent light) penetrates through the movable reflection film 25, the movable portion 21, the movable antireflection film 26, the fixed antireflection film 42, the third substrate 4, and the fixed antireflection film 49 so that it is emitted upward from the optical device 1. At that time, the coherent light is hardly lost because of the movable antireflection film 26, the fixed antireflection film 42, and the fixed antireflection film 49 while being emitted from the optical device 1.

In the present embodiment, light is introduced into the first gap G1 and emitted upward from the optical device 1. However, light may be introduced into the first gap G1 and emitted downward from the optical device 1. Further, in the present embodiment, light is introduced from below the optical device 1. However, light may be introduced from above the optical device 1.

As described above, the optical device 1 has the first electrode portion 33 facing a surface of the movable portion 21 near the fixed reflection film 35 with the second gap G2 formed between the movable portion 21 and the first electrode portion 33 and the second electrode portion 43 facing another surface opposite of the movable portion 21 to the fixed reflection film 35. One of the first electrode portion 33 and the second electrode portion 43 serves as a detection electrode for detecting a capacitance between the movable portion 21 and the electrode portion. The other of the first electrode portion 33 and the second electrode portion 43 serves as a drive electrode for generating a potential difference between the movable portion 21 and the electrode portion so as to generate an electrostatic attraction force between the movable portion 21 and the electrode portion for changing a position and/or a posture of the movable portion 21.

With the above arrangement, a long distance can be maintained between the drive electrode and the detection electrode. As a result, it is possible to reduce a coupling capacitance produced between the drive electrode and the detection electrode. Accordingly, it is possible to detect a capacitance between the movable portion 21 and the detection electrode with high accuracy and to accurately move the movable portion 21 so as to have a desired position and posture based on the detection results. At that time, the drive electrode and the detection electrode can be located so as to overlap with each other in a plan view. Therefore, it is possible to increase an area of the drive electrode so as to reduce a driving voltage and simultaneously increase an area of the detection electrode so as to improve detection accuracy. Thus, the optical device 1 according to the present invention can have excellent optical properties with a reduced driving voltage.

Particularly, in the present embodiment, a capacitance between one of the electrode portions and the movable portion 21 is detected, and a potential difference is generated between the other of the electrode portions and the movable portion 21 based on the detection results. Thus, an electrostatic attraction force is generated between the other of the electrode portions and the movable portion 21 so as to change a position and/or a posture of the movable portion 21. Accordingly, it is possible to accurately move the movable portion 21 so as to have a desired position and posture.

The detection of a capacitance may be performed only at calibration. In this case, a potential difference may be generated between the other of the electrode portions and the movable portion 21 based on a preset conversion table or the like. After the calibration, all of the electrodes 33$a$, 33$b$, 43$a$, and 43$b$ can be used as a drive electrode.

Further, each of the first electrode portion 33 and the second electrode portion 43 can serve as a drive electrode for driving the movable portion 21. Specifically, each of the first electrode portion 33 and the second electrode portion 43 is configured to switch its function between a detection electrode and a drive electrode. Thus, the movable portion 21 can be moved either toward the first electrode portion 33 or toward the second electrode portion 43. Accordingly, it is possible to reduce a stress produced in the movable portion 21 and widen a movable range of the movable portion 21. As a result, the optical device 1 can be used for light having a wide range of wavelengths. Further, it is possible to reduce a driving force required to move the movable portion 21 and hence reduce a driving voltage.

<Manufacturing Method of the Optical Device>

Next, an example of a manufacturing method of the optical device 1 will be described below with reference to FIGS. 6A to 9D.

FIGS. 6A to 9D are views explanatory of a manufacturing process of the optical device 1. FIGS. 6A to 9D are cross-sectional views corresponding to the cross-sectional view taken along line III-III of FIG. 2.

In the present embodiment, the manufacturing method of the optical device 1 includes A) a step of producing a second substrate 3, B) a step of bonding an SOI substrate to the second substrate 3, C) a step of processing the SOI substrate so as to produce a first substrate 2, D) a step of producing a third substrate 4, and E) a step of bonding the third substrate 4 to the first substrate 2. These steps will be described below.

A) Producing a Second Substrate 3

A-1. First, as shown in FIG. 6A, a substrate 3a having a light transmittance is prepared for a second substrate 3. A substrate having a uniform thickness without deflection or scratches can suitably be used as the substrate 3a. The example materials described in connection with the second substrate 3 can be used for the substrate 3a. As described above, it is preferred that the substrate 3a is made of glass containing alkali metal (movable ions) such as sodium (Na) or potassium (K). The following description relates to a case where the substrate 3a is made of glass containing alkali metal.

A-2. Next, as shown in FIG. 6B, a mask layer 5 is formed on a surface of the substrate 3a (masking). Examples of a material for the mask layer 5 include metals such as Au/Cr, Au/Ti, Pt/Cr, and Pt/Ti, polycrystalline silicon (polysilicon), silicon such as amorphous silicon, and silicon nitride. With the mask layer 5 made of silicon, adhesiveness can be improved between the mask layer 5 and the substrate 3a. With the mask layer 5 made of metal, visibility of the formed mask layer 5 can be improved.

The thickness of the mask layer 5 is not limited to a specific value. It is preferred that the thickness of the mask layer 5 is in a range of about 0.01 μm to about 1 μm, preferably about 0.09 μm to about 0.11 μm. If the mask layer 5 is excessively thin, the mask layer 5 may fail to sufficiently protect the substrate 3a. If the mask layer 5 is excessively thick, the mask layer 5 may be likely to be peeled off due to an internal stress of the mask layer 5.

For example, the mask layer 5 can be formed by a chemical vapor deposition (CVD) method, a sputtering method, a vapor phase deposition method such as an evaporation method, a plating method, or the like.

A-3. Then, as shown in FIG. 6C, an opening 51 is formed in the mask layer 5 so as to have a shape corresponding to a first recess 31, groove portions 36a and 36b, and third recesses 37a and 37b in a plan view. More specifically, photolithography is used to form the opening 51. A photoresist is applied onto the mask layer 5. Thereafter, exposure and development are performed to form a resist mask having an opening corresponding to the opening 51. Then the mask layer 5 is etched with the resist mask to remove a portion of the mask layer 5. Subsequently, the resist mask is removed. In this manner, the opening 51 is formed in the mask layer 5. Examples of the etching method include dry etching methods using a CF gas, a chlorine gas, or the like, and wet etching methods using a hydrofluoric acid-nitric acid solution or an alkali solution.

A-4. Subsequently, a surface of the substrate 3a is etched with the mask layer 5 so as to form the first recess 31, the groove portions 36a and 36b, and the third recesses 37a and 37b in the substrate 3a as shown in FIG. 6D. Although either a dry etching method or a wet etching method may be used, it is desirable to employ a wet etching method because the formed first recess 31 can have an ideal cylindrical shape. In this case, for example, a hydrofluoric acid etching liquid is suitably used as an etching liquid in the wet etching method. Further, when alcohol such as glycerin (particularly polyhydric alcohol) is added to an etching liquid, the formed first recess 31 can have a remarkably smooth bottom.

A-5. After the mask layer 5 is removed, as shown in FIG. 6E, a mask layer 6 with an opening having a shape corresponding to a second recess 32 in a plan view is formed on the substrate 3a in the same manner as described in steps A-2 and A-3. A method of removing the mask layer 5 is not limited to a specific one. For example, the mask layer 5 may be removed by a wet etching method using an alkali solution such as a tetramethylammonium hydroxide solution, a hydrochloric acid-nitric acid solution, a hydrofluoric acid-nitric acid solution, or the like, or a dry etching method using a CF gas, a chlorine gas, or the like. Particularly, when a wet etching method is used to remove the mask layer 5, it is possible to efficiently remove the mask layer 5 with a simple operation.

A-6. Next, the substrate 3a is etched with the mask layer 6 in the same manner as described in step A-4 so as to form a second recess 32 as shown in FIG. 6F. A mask layer 6A is formed so as to have an opening having a shape corresponding to a fixed reflection film 35 in a plan view. The formation of the mask layer 6A may be performed after the removal of the mask layer 6 or without the removal of the mask layer 6.

Figure 6G:
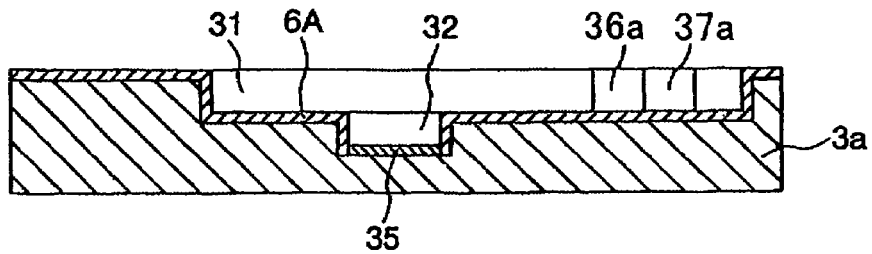

A-7. Subsequently, as shown in FIG. 6G, a fixed reflection film 35 is formed on a bottom of the second recess 32 with use of the mask layer 6A. More specifically, as described above, layers having a high refractive index and layers having a low refractive index are alternately stacked on the bottom of the second recess 32 so as to form the fixed reflection film 35. For example, a chemical vapor deposition method (CVD) or a physical vapor deposition (PVD) can suitably be used to form layers having a high refractive index and layers having a low refractive index.

Figure 6H:
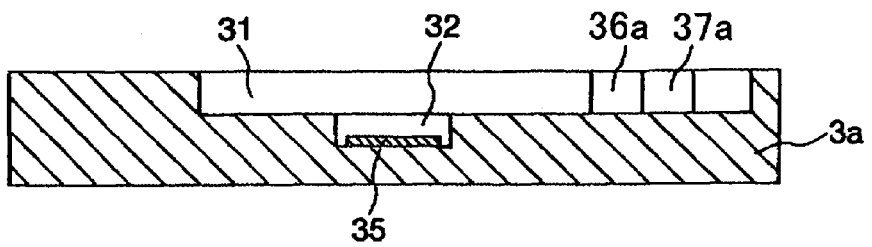

A-8. Next, as shown in FIG. 6H, the mask layer 6A is removed in the same manner as described in step A-5.

Figure 6I:
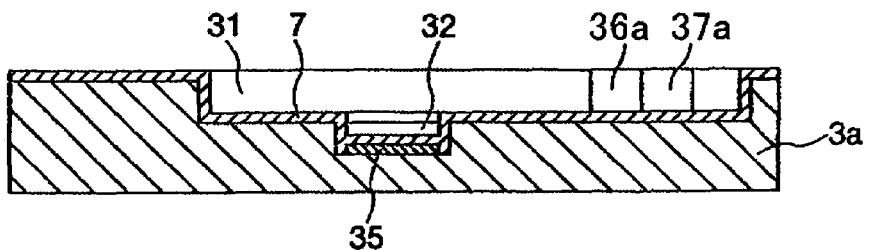

A-9. Then, as shown in FIG. 6I, a conductive layer 7 for forming first electrodes 33a, 33b, extension electrodes 38a and 38b is formed uniformly on a surface of the substrate 3a in which the first recess 31 is formed. For example, a chemical vapor deposition method (CVD) or a physical vapor deposition (PVD) can suitably be used to form the conductive layer 7. The example materials described in connection with the first electrode portion 33 can be used for the conductive layer 7.

Figure 6J:
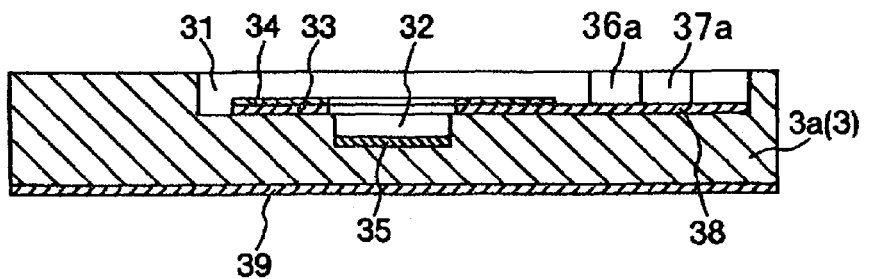

A-10. Subsequently, as shown in FIG. 6J, unnecessary portions of the conductive layer 7 are removed to form a first electrode portion 33. Further, an insulator film 34 is formed on the first electrode portion 33. Furthermore, a fixed antireflection film 39 is formed on a surface of the substrate 3a opposite to the surface in which the first recess 31 is formed.

The unnecessary portions of the conductive layer 7 can be removed in the same manner as described in step A-3. The first electrode portion 33 can be formed in the same manner as described for the formation of the mask layer 5. The fixed antireflection film 39 can be formed in the same manner as described for the formation of the fixed reflection film 35.

Thus, it is possible to produce a second substrate 3.

B) Bonding an SOI Substrate to the Second Substrate 3

Figure 7A:
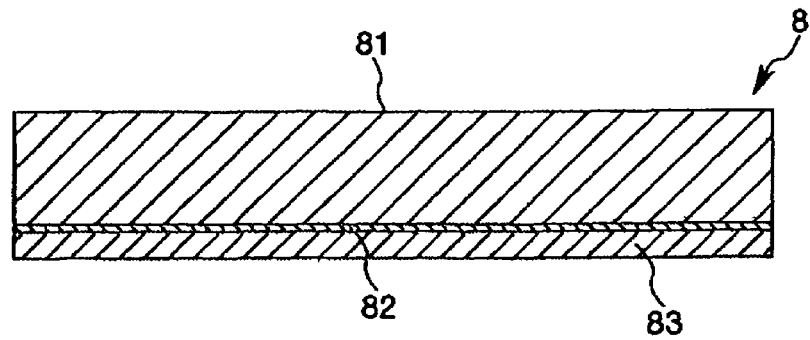
FIGS. 7A to 7C are views explanatory of a manufacturing method of the optical device shown in FIG. 1.

B-1. First, as shown in FIG. 7A, a Silicon-on-Insulator (SOI) substrate 8 is prepared. The SOI substrate 8 includes a base layer 81 made of Si, an insulating layer 82 made of $SiO_2$, and an active layer 83 made of Si, which are stacked in the named order. The thickness of the SOI substrate 8 is not limited to a specific value. It is preferred that the thickness of the active layer 83 is in a range of about 10 μm to about 100 μm. A Silicon-on-Sapphire (SOS) substrate, a silicon substrate, and the like may be used instead of the SOI substrate 8.

Figure 7B:
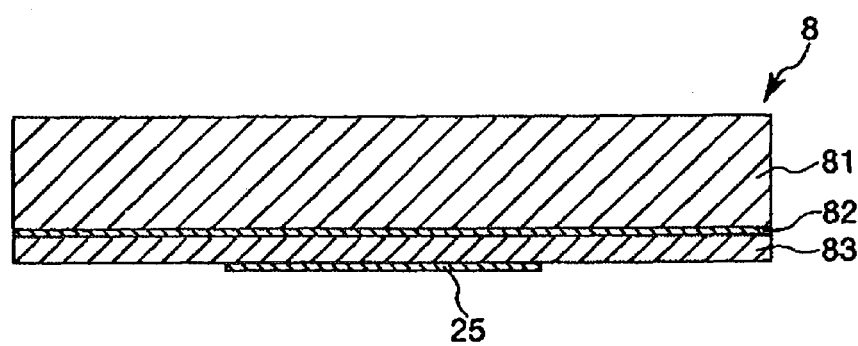

B-2. Next, as shown in FIG. 7B, a movable reflection film 25 is formed on a surface of the active layer 83 in the SOI substrate 8 prior to bonding of the SOI substrate 8 and the second substrate 3. The movable reflection film 25 can be formed in the same manner as described for the formation of the fixed reflection film 35.

Figure 7C:
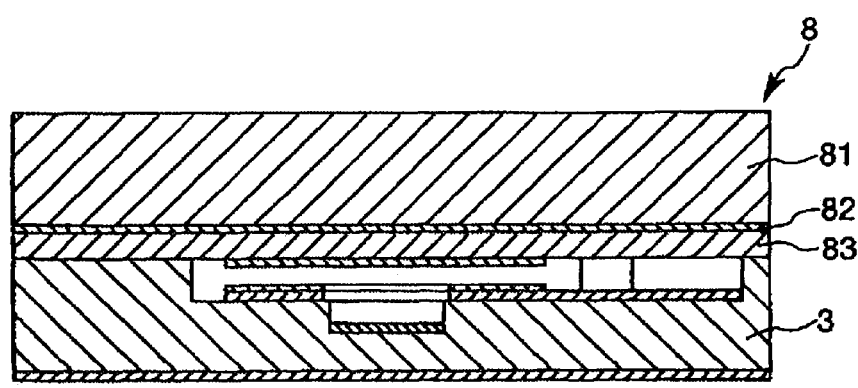

B-3. Then, as shown in FIG. 7C, the SOI substrate 8 is bonded to the second substrate 3. Examples of a method of bonding the SOI substrate 8 to the second substrate 3 include anodic bonding, bonding by an adhesive agent, surface activation bonding, and bonding with low-melting glass. It is desirable to use anodic bonding.

For example, when the SOI substrate 8 is bonded to the second substrate 3 by anodic bonding, the second substrate 3 is connected to a negative terminal of a direct current power source (not shown) while the active layer 83 of the SOI substrate 8 is connected to a positive terminal of the direct current power source. A voltage is applied between the second substrate 3 and the active layer 83 of the SOI substrate 8 while the second substrate 3 is heated. Under the heating conditions, positive ions of alkali metal in the second substrate 3, such as sodium ions ($Na^+$), become likely to move. Accordingly, a bonding surface of the second substrate 3 is negatively charged, and a bonding surface of the active layer 83 is positively charged. As a result, the second substrate 3 and the active layer 83 are firmly bonded to each other by a covalent bond in which silicon (Si) and oxygen (O) share an electron pair.

C) Producing a First Substrate 2

C-1. As shown in FIG. 8A, the base layer 81 is removed by etching or polishing. For example, a wet etching method or a dry etching method may be used to remove the base layer 81. It is desirable to use a dry etching method. In either case, the insulating layer 82 serves as a stopper when the base layer 81 is removed. A dry etching method can prevent damage of the active layer 83 facing the first electrode portion 33 because it uses no etching liquid. Accordingly, it is possible to improve a yield of manufacturing optical devices.

C-2. Next, as shown in FIG. 8B, the insulating layer 82 is removed by etching. For example, a wet etching method or a dry etching method may be used to remove the insulating layer 82. It is desirable to use a wet etching method with an etching liquid containing hydrofluoric acid. In this case, the insulating layer 82 can readily be removed, and a surface of the active layer 83 that is exposed by removal of the insulating layer 82 can be smoothened to a high degree.

When a silicon substrate having a thickness suitable for the following steps is used in step B-1, it is possible to eliminate steps C-1 and C-2 so as to simplify a manufacturing process of the optical device 1.

C-3. Then, as shown in FIG. 8C, a movable antireflection film 26 is formed on an upper surface of the active layer 83.

The movable antireflection film 26 can be formed in the same manner as described for the formation of the fixed reflection film 35.

C-4. Subsequently, as shown in FIG. 8D, a resist layer 9 having openings corresponding to opening portions 24 and opening portions 27a and 27b is formed on the active layer 83. The resist layer 9 can be formed in the same manner as described in steps A-2 and A-3.

C-5. Next, the active layer 83 is etched with the resist layer 9 by a dry etching method, particularly an ICP etching method, so as to form opening portions 27a and 27b as shown in FIG. 8E. Then, as shown in FIG. 8F, opening portions 24 are formed. Thus, the movable portion 21, the support portion 22, and the connection portions 23 are formed in the active layer 83.

More specifically, when the active layer 83 is etched with the resist layer 9 by a dry etching method, an etching rate at an area of the opening portions 27a and 27b becomes lower than an etching rate at an area of the opening portions 24 due to microloading effect. Accordingly, as shown in FIG. 8E, the formation of the opening portions 27a and 27b is completed before the opening portions 24 are formed. At that time, the opening portions 27a and 27b are formed above the third recesses 37a and 37b, which communicate the first recess 31 via the groove portions 36a and 36b, respectively. Thus, a space between the active layer 83 and the second substrate 3 is released to an external atmosphere so as to eliminate a pressure difference between the space and the external atmosphere.

The microloading effect is a phenomenon in which an etching rate is lowered as an opening size becomes smaller. Accordingly, an area of the opening portions 27a and 27b should be designed so as to have an etching rate higher than an etching rate at an area of the opening portions 24. In the present embodiment, as shown in FIG. 1, each of the opening portions 27a and 27b has a square shape, each side of which has a length longer than a smaller width of each opening portion 24. The opening portions 27a and 27b may have any size and shape as long as an etching rate at an area of the opening portions 27a and 27b is higher than an etching of an area of the opening portions 24.

Thus, the opening portions 24 and the opening portions 27a and 27b can be formed in the same etching step by the microloading effect. Specifically, the opening portions 24 can be formed subsequently to the formation of the opening portions 27a and 27b. Accordingly, a separate etching step is not required to form the opening portions 27a and 27b. In this manner, it is possible to simplify a manufacturing process of the optical device 1.

After the opening portions 27a and 27b have been formed, dry etching is continued so as to form the opening portions 24 as shown in FIG. 8F. Thus, formation of the movable portion 21, the support portion 22, and the connection portions 23 is completed.

As described above, since a pressure difference between a space between the active layer 83 and the second substrate 3 and the external atmosphere has been eliminated before the movable portion 21 is formed in the active layer 83 (i.e., before the opening portions 24 are formed in the active layer 83), the connection portions 23 can be prevented from being broken according to the formation of the opening portions 24.

Particularly, ICP etching is conducted in this step. Specifically, etching with an etching gas and formation of a protective film with a deposition gas are alternately repeated to form the movable portion 21. For example, $SF_6$ may be used as the etching gas, and $C_4F_8$ may be used as the deposition gas.

In this step, anisotropic etching is conducted with use of dry etching technology for the following reasons.

In a case of wet etching technology, according to progress of an etching process, an etching liquid may be introduced from holes formed in the active layer 83 into between the active layer 83 and the second substrate 3 so as to remove the first electrode portion 33 or the insulator film 34. In contrast to the wet etching, such a problem does not arise in dry etching technology.

Further, in a case of isotropic etching, the active layer 83 is isotropically etched so as to cause side-etching. Particularly, if side-etching is caused in the connection portions 23, then the strength of the connection portions 23 is lowered so as to deteriorate the durability of the connection portions 23. On the other hand, anisotropic etching does not cause side-etching. Accordingly, anisotropic etching is advantageous in a control of an etching size. Thus, side surfaces of the connection portions 23 are formed so as to be perpendicular to the surface of the active layer 83. Accordingly, it is possible to enhance the strength of the connection portions 23.

In the above step, the movable portion 21, the support portion 22, and the connection portions 23 may be formed by other dry etching methods. Further, the movable portion 21, the support portion 22, and the connection portions 23 may be formed by a method other than a dry etching method.

C-6. Then, as shown in FIG. 8G, the resist layer 9 is removed so as to produce a structure in which the first substrate 2 and the second substrate 3 are bonded to each other.

D) Producing a Third Substrate 4

Figure 9A:
FIGS. 9A to 9D are views explanatory of a manufacturing method of the optical device shown in FIG. 1.

D-1. First, as shown in FIG. 9A, a substrate 4a having a light transmittance is prepared for a third substrate 4. As with the aforementioned substrate 3a, a substrate having a uniform thickness without deflection or scratches can suitably be used as the substrate 4a. As with the substrate 3a, the example materials described in connection with the second substrate 3 can be used for the substrate 4a.

Figure 9B:
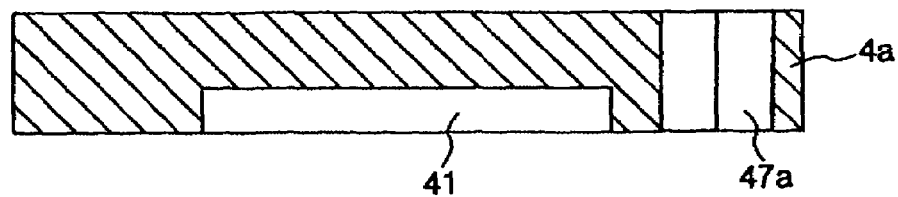

D-2. Next, as shown in FIG. 9B, a recess 41 and opening portions 47a and 47b are formed in the same manner as described in steps A-1 to A-4.

Figure 9C:
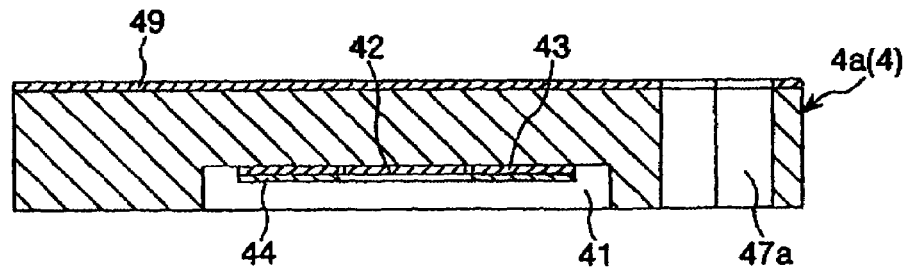

D-3. Then, as shown in FIG. 9C, a second electrode portion 43, an insulator film 44, and fixed antireflection films 42 and 49 are formed in the same manner in steps A-7 to A-10.

Thus, it is possible to produce a third substrate 4.

E) Bonding the Third Substrate 4 to the First Substrate

Next, the third substrate 4 produced in process D) is bonded to the structure of the first substrate 2 produced in process C) in the same manner as described in step B-3.

Figure 9D:
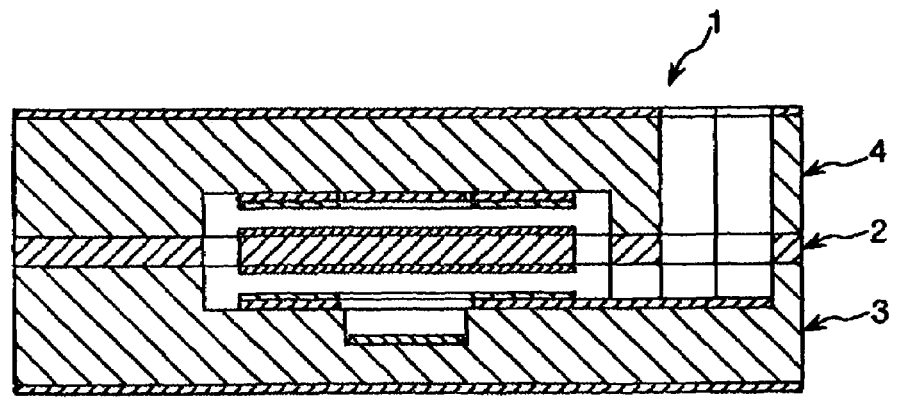

Thus, as shown in FIG. 9D, it is possible to manufacture an optical device 1.

The optical device 1 (optical tunable filter) described above is used as shown in FIGS. 10 and 11.

Figure 10:
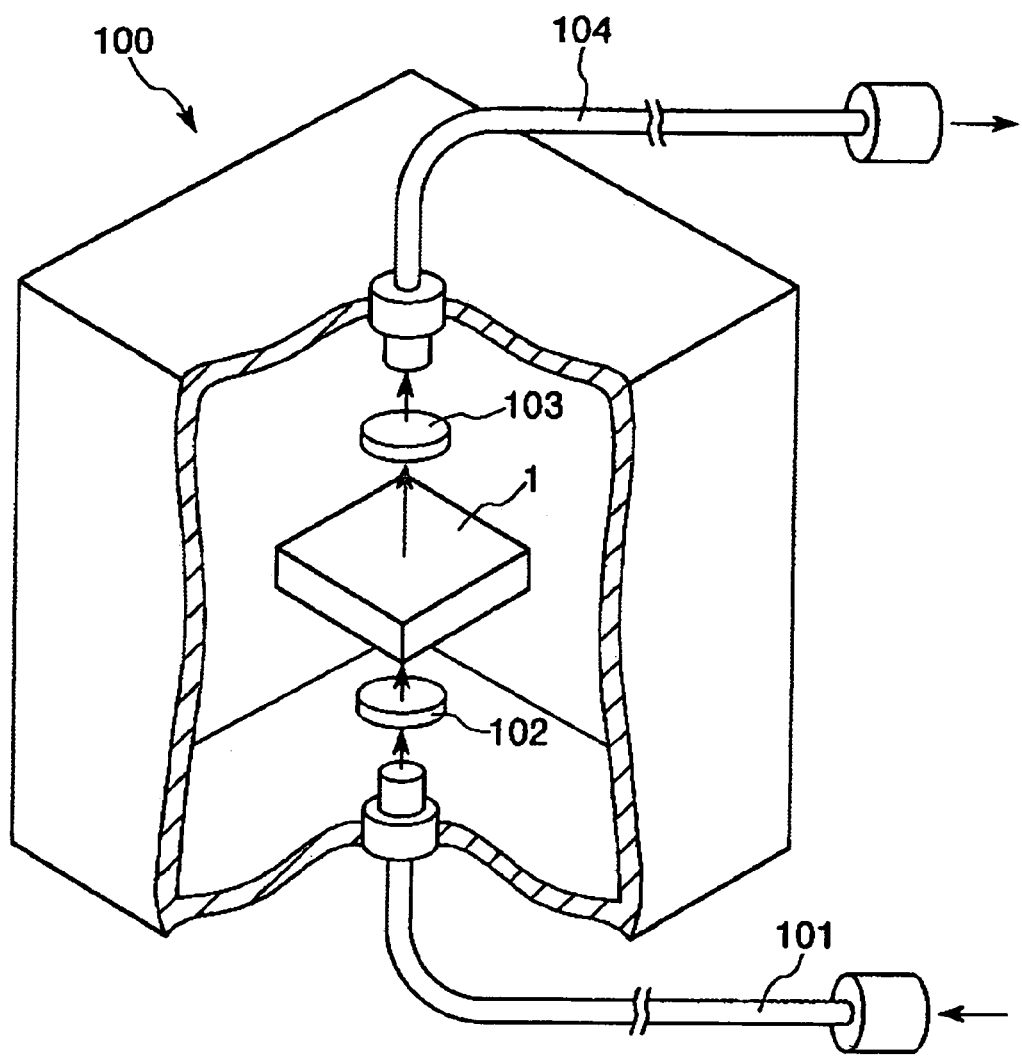
FIG. 10 is a view showing an optical tunable filter module according to an embodiment of the present invention.
Figure 11:
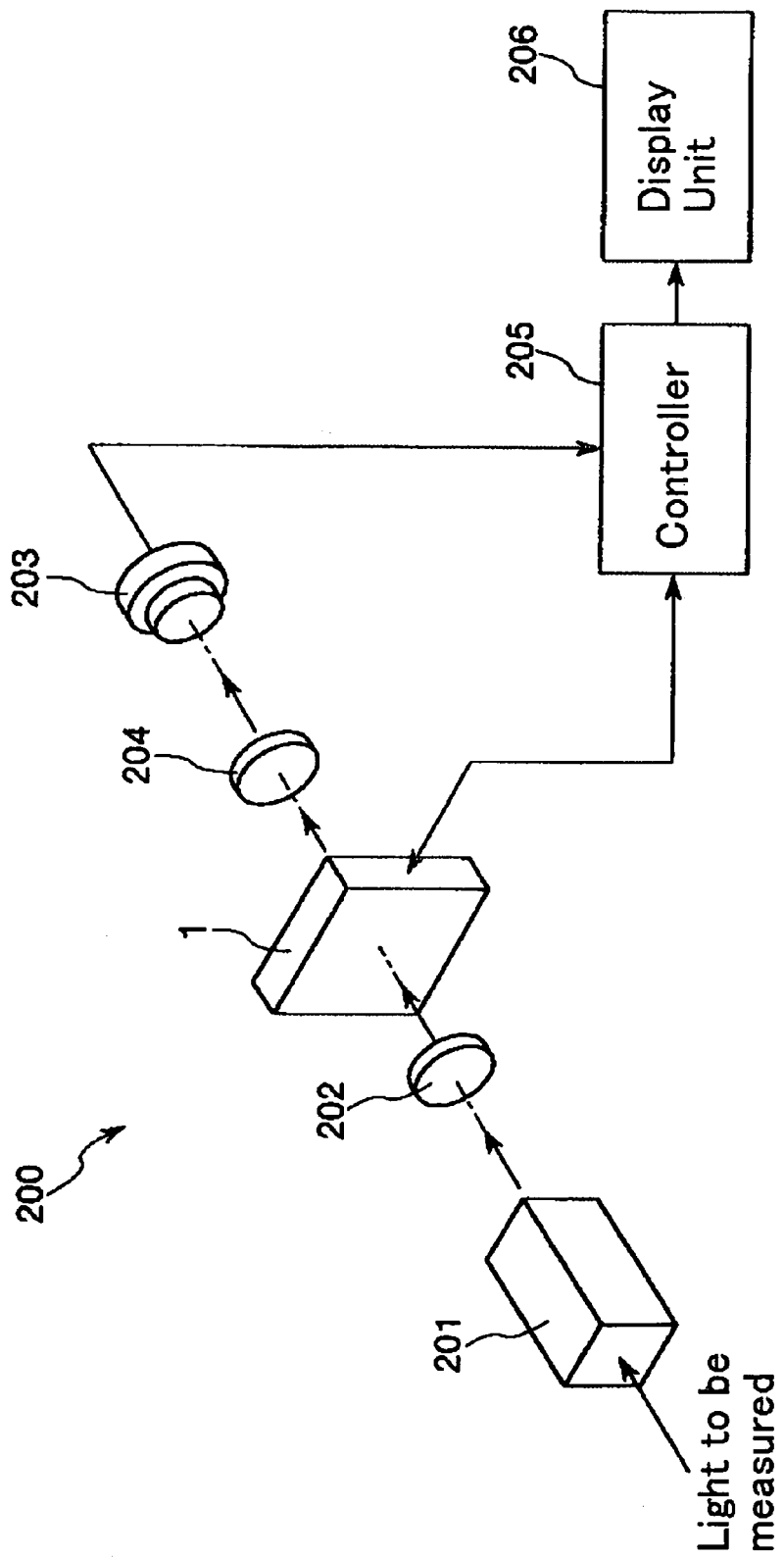
FIG. 11 is a view showing an optical spectrum analyzer according to an embodiment of the present invention.

FIG. 10 is a view showing an optical tunable filter module 100 according to an embodiment of the present invention. FIG. 11 is a view showing an optical spectrum analyzer 200 according to an embodiment of the present invention.

For example, the optical tunable filter module 100 shown in FIG. 10 is provided on an optical transmission line in an optical network such as a wavelength division multiplexed (WDM) optical transmission system. The optical tunable filter module 100 has an optical tunable filter formed by the optical device 1 described above, an optical fiber 101, a lens 102, a lens 103, and an optical fiber 104. The optical fiber 101 and the lens 102 are used to introduce light into the optical device 1. The lens 103 and the optical fiber 104 are used to introduce light emitted from the optical device 1 into the exterior of the optical tunable filter module 100.

With the optical tunable filter module 100, light having a plurality of wavelengths is introduced through the optical fiber 101 and the lens 102 into the optical device 1. The optical tunable filter module 100 can extract light having a desired wavelength and output the extracted light through the lens 103 and the optical fiber 104.

The optical tunable filter module 100 can have excellent optical properties with a reduced driving voltage.

The optical spectrum analyzer 200 shown in FIG. 11 is operable to measure spectrum characteristics of light (relationship between a wavelength and an intensity of light). The optical spectrum analyzer 200 has a light application unit 201 to which light is applied, the optical device 1 described above, an optical system 202 for introducing light from the light application unit 201 into the optical device 1, a light-receiving element 203 for receiving light emitted from the optical device 1, an optical system 204 for introducing the light emitted from the optical device 1 into the light-receiving element 203, a controller 205 for controlling the optical device 1 and calculating spectrum characteristics of the light based on the output of the light-receiving element 203, and a display unit 206 for displaying the calculation results of the controller 205.

With the optical spectrum analyzer 200, light is applied to the light application unit 201 and then introduced through the optical system 202 into the optical device 1. The light-receiving element 203 receives light emitted from the optical device 1 through the optical system 204. The intensity of the received light is calculated by the controller 205. At that time, the intensity of the light received by the light-receiving element 203 is calculated while the controller 205 sequentially changes an interference condition of the optical device 1. The controller 205 operates the display unit 206 so as to display information on the intensity of the light at various wavelengths (e.g., a spectrum waveform).

The optical spectrum analyzer 200 can have excellent optical properties with a reduced driving voltage.

Although certain preferred embodiments of an optical device, an optical tunable filter, an optical tunable filter module, and an optical spectrum analyzer according to the present invention have been shown and described in detail, it should be understood that various changes and modifications may be made therein without departing from the spirit of the present invention. For example, each component may be replaced with another component having the same function. Further, any additional component may be added to components of the present invention.

For example, a tunable light source and a tunable laser can be implemented by the aforementioned optical device 1.

In the above embodiment, the first gap G1 and the second gap G2 are formed by the first recess 31. However, a spacer may be provided between the second substrate 3 and the first substrate 2 to form the first gap G1 and the second gap G2 without the first recess 31.

What is claimed is:

1. An optical device comprising:
a fixed portion having a first light reflection portion;
a movable portion having a first surface that faces the fixed portion and a second surface opposite to the first surface, the movable portion having a second light reflection portion formed on the first surface of the movable portion, the second light reflection portion facing the first light reflection portion with a first gap being formed between the first light reflection portion and the second light reflection portion, the movable portion being movable with respect to the fixed portion so as to change the first gap between the first light reflection portion and the second light reflection portion, the first light reflection portion and the second light reflection portion being configured to reflect light that enters into the optical device from the outside of the optical device repeatedly between the first light reflection portion and the second light reflection portion so as to cause interference and emit light having a wavelength corresponding to a size of the first gap to the outside of the optical device;

a first electrode portion fixed to the fixed portion so as to face the second light reflection portion near the first light reflection portion with a second gap being formed between the second light reflection portion and the first electrode portion;

a second electrode portion facing the second surface of the movable portion with a third gap being formed between the second surface of the movable portion and the second electrode portion, one of the first electrode portion and the second electrode portion serving as a detection electrode for detecting a capacitance between the movable portion and the detection electrode, another of the first electrode portion and the second electrode portion serving as a drive electrode; and a circuit operable to generate a potential difference between the movable portion and the drive electrode so as to generate an electrostatic attraction force therebetween for changing a position and/or a posture of the movable portion, wherein the circuit includes a switching unit operable to switch the first electrode portion and the second electrode portion between a function of the detection electrode and a function of the drive electrode.

2. The optical device as recited in claim 1, wherein the circuit is operable to generate the potential difference based on a detection result of the detection electrode.

3. The optical device as recited in claim 1, wherein each of the first electrode portion and the second electrode portion has a plurality of electrodes.

4. The optical device as recited in claim 3
wherein the number of the plurality of electrodes of the second electrode portion are equal to that of as the plurality of electrodes of the first electrode portion,
wherein the plurality of electrodes of the first electrode portion are paired with the plurality of electrodes of the second electrode portion.

5. The optical device as recited in claim 4, wherein each of the plurality of electrodes of the first electrode portion has a shape similar to a shape of each of the plurality of electrodes of the second electrode portion.

6. The optical device as recited in claim 5, wherein each of the plurality of electrodes of the first electrode portion has the same size as that of each of the plurality of electrodes of the second electrode portion.

7. The optical device as recited in claim 1, further comprising:
a support portion for supporting the movable portion; and
a connection portion connecting the movable portion to the support portion so that the movable portion can be moved with respect to the support portion, the movable portion being formed integrally with the support portion and the connection portion.

8. The optical device as recited in claim 7, further comprising:
a first substrate in which the movable portion, the support portion, and the connection portion are formed, the first substrate having a first surface and a second surface opposite to the first surface;

a second substrate fixed to the support portion on the first surface of the first substrate, the first electrode portion and the first light reflection portion being provided on the second substrate;

a third substrate having one surface and the other surface opposite to the one surface, the other surface of the third substrate fixed to the support portion on the second surface of the first substrate, the second electrode portion being provided on the third substrate; and a hermetically sealed space formed between the first substrate, the second substrate, and the third substrate so that the movable portion can be moved within the hermetically sealed space.

9. The optical device as recited in claim 8, wherein the second substrate has a recess formed in a surface thereof near the first substrate, the recess having a bottom on which the first light reflection portion and the first electrode portion are provided.

10. The optical device as recited in claim 8, wherein the second substrate has:
a first recess having a bottom on which the first electrode portion is provided, and
a second recess formed in the bottom of the first recess so as to be surrounded by the first recess, the second recess having a bottom on which the first light reflection portion is provided.

11. The optical device as recited in claim 10, wherein the first electrode portion is provided so as to surround the first light reflection portion.

12. The optical device as recited in claim 8, wherein the first substrate is mainly made of silicon.

13. The optical device as recited in claim 12, wherein at least one of the second substrate and the third substrate is mainly made of glass.

14. The optical device as recited in claim 13, wherein at least one of the second substrate and the third substrate is mainly made of glass containing alkali metal ions.

15. The optical device as recited in claim 8, wherein the first substrate is formed by processing one of Si layers in an SOI wafer.

16. The optical device as recited in claim 1, wherein at least one of the first light reflection portion and the second light reflection portion comprises a dielectric multilayer film.

17. The optical device as recited in claim 1, wherein a distance of the first gap is substantially the same as a distance of the second gap in a state where the potential difference is not generated.

18. The optical device as recited in claim 17, wherein the first electrode portion and the second electrode portion are provided symmetrically with respect to the movable portion in a state where the potential difference is not generated.

19. An optical tunable filter comprising:
a fixed portion having a first light reflection portion;
a movable portion having a first surface that faces the fixed portion and a second surface opposite to the first surface, the movable portion having a second light reflection portion formed on the first surface of the movable portion, the second light reflection portion facing the first light reflection portion with a first gap being formed between the first light reflection portion and the second light reflection portion, the movable portion being movable with respect to the fixed portion so as to change the first gap between the first light reflection portion and the second light reflection portion, the first light reflection portion and the second light reflection portion being configured to reflect light that enters into the optical device from the outside of the optical device repeatedly between the first light reflection portion and the second light reflection portion so as to cause interference and emit light having a wavelength corresponding to a size of the first gap to the outside of the optical device;

a first electrode portion fixed to the fixed portion so as to face the second light reflection portion near the first light reflection portion with a second gap being formed between the second light reflection portion and the first electrode portion;

a second electrode portion facing the second surface of the movable portion with a third gap being formed between the second surface of the movable portion and the second electrode portion, one of the first electrode portion and the second electrode portion serving as a detection electrode for detecting a capacitance between the movable portion and the detection electrode, another of the first electrode portion and the second electrode portion serving as a drive electrode; and a circuit operable to generate a potential difference between the movable portion and the drive electrode so as to generate an electrostatic attraction force therebetween for changing a position and/or a posture of the movable portion, wherein the circuit includes a switching unit operable to switch the first electrode portion and the second electrode portion between a function of the detection electrode and a function of the drive electrode.

20. An optical tunable filter module comprising an optical tunable filter including:

a fixed portion having a first light reflection portion;

a movable portion having a first surface that faces the fixed portion and a second surface opposite to the first surface, the movable portion having a second light reflection portion formed on the first surface of the movable portion, the second light reflection portion facing the first light reflection portion with a first gap being formed between the first light reflection portion and the second light reflection portion, the movable portion being movable with respect to the fixed portion so as to change the first gap between the first light reflection portion and the second light reflection portion, the first light reflection portion and the second light reflection portion being configured to reflect light that enters into the optical device from the outside of the optical device repeatedly between the first light reflection portion and the second light reflection portion so as to cause interference and emit light having a wavelength corresponding to a size of the first gap to the outside of the optical device;

a first electrode portion fixed to the fixed portion so as to face the second light reflection portion near the first light reflection portion with a second gap being formed between the second light reflection portion and the first electrode portion;

a second electrode portion facing the second surface of the movable portion with a third gap being formed between the second surface of the movable portion and the second electrode portion, one of the first electrode portion and the second electrode portion serving as a detection electrode for detecting a capacitance between the movable portion and the detection electrode, another of the first electrode portion and the second electrode portion serving as a drive electrode; and a circuit operable to generate a potential difference between the movable portion and the drive electrode so as to generate an electrostatic attraction force therebetween for changing a position and/or a posture of the movable portion, wherein the circuit includes a switching unit operable to switch the first electrode portion and the second electrode portion between a function of the detection electrode and a function of the drive electrode.

21. An optical spectrum analyzer comprising an optical tunable filter including:

a fixed portion having a first light reflection portion;

a movable portion having a first surface that faces the fixed portion and a second surface opposite to the first surface, the movable portion having a second light reflection portion formed on the first surface of the movable portion, the second light reflection portion facing the first light reflection portion with a first gap being formed between the first light reflection portion and the second light reflection portion, the movable portion being movable with respect to the fixed portion so as to change the first gap between the first light reflection portion and the second light reflection portion, the first light reflection portion and the second light reflection portion being configured to reflect light that enters into the optical device from the outside of the optical device repeatedly between the first light reflection portion and the second light reflection portion so as to cause interference and emit light having a wavelength corresponding to a size of the first gap to the outside of the optical device;

a first electrode portion fixed to the fixed portion so as to face the second light reflection portion near the first light reflection portion with a second gap being formed between the second light reflection portion and the first electrode portion;

a second electrode portion facing the second surface of the movable portion with a third gap being formed between the second surface of the movable portion and the second electrode portion, one of the first electrode portion and the second electrode portion serving as a detection electrode for detecting a capacitance between the movable portion and the detection electrode, another of the first electrode portion and the second electrode portion serving as a drive electrode; and a circuit operable to generate a potential difference between the movable portion and the drive electrode so as to generate an electrostatic attraction force therebetween for changing a position and/or a posture of the movable portion, wherein the circuit includes a switching unit operable to switch the first electrode portion and the second electrode portion between a function of the detection electrode and a function of the drive electrode.

22. The optical device as recited in claim 8, wherein the third substrate has a third recess formed in the other surface, the third recess has a bottom facing the second surface of the movable portion, wherein a fixed antireflection film is formed on the bottom of the third recess so as to be surrounded by the second electrode portion.

23. The optical device as recited in claim 8, wherein a fixed antireflection film is formed on the one surface of the third substrate.

* * * * *